United States Patent [19]

Rokutanda et al.

[11] 4,245,301
[45] Jan. 13, 1981

[54] INFORMATION PROCESSING SYSTEM

[75] Inventors: Takashi Rokutanda, Tachikawa; Yukio Shiraogawa, Kunitachi; Yutaka Nakajima, Koganei; Keizo Aoyagi; Takashi Hiraoka, both of Fuchu, all of Japan

[73] Assignee: Tokyo Shibaura Denki Kabushiki Kaisha, Japan

[21] Appl. No.: 930,406

[22] Filed: Aug. 2, 1978

[30] Foreign Application Priority Data

Aug. 3, 1977 [JP] Japan .................. 52-92572

[51] Int. Cl.³ .................. G06F 9/46; G06F 15/16
[52] U.S. Cl. .................................. 364/200
[58] Field of Search ... 364/200 MS File, 900 MS File

[56] References Cited

U.S. PATENT DOCUMENTS

| | | | |
|---|---|---|---|
| 3,061,192 | 10/1962 | Terzian | 364/200 |
| 3,538,502 | 11/1970 | Aranyi et al. | 364/200 |
| 3,614,741 | 10/1971 | McFarland, Jr. et al. | 364/200 |
| 3,678,467 | 7/1972 | Nussbaum et al. | 364/200 |
| 3,710,324 | 1/1973 | Cohen et al. | 364/200 |
| 3,858,182 | 12/1974 | Delagi et al. | 364/200 |
| 3,967,246 | 6/1976 | House | 364/200 |
| 4,004,283 | 1/1977 | Bennett et al. | 364/200 |
| 4,084,233 | 4/1978 | Handly et al. | 364/200 |
| 4,109,311 | 8/1978 | Blum et al. | 364/200 |
| 4,110,823 | 8/1978 | Cronshaw et al. | 364/200 |

OTHER PUBLICATIONS

*PDP-11 Peripherals Handbook*-Chapter 5-"Unibus Theory and Operation", Digital Equipment Corporation-1973, pp. 5-1 thru 5-5.

*Primary Examiner*—Joseph F. Ruggiero
*Attorney, Agent, or Firm*—Finnegan, Henderson, Farabow, Garrett & Dunner

[57] ABSTRACT

An information processing system having a main memory unit, an arithmetic control unit, and a plurality of input/output units, is comprised of a first bus, which is bidirectional, commonly connecting the main memory unit, the arithmetic control unit, and at least one input-/output unit, a bus controller for controlling data transfer between two units connecting to the first bus, a second bus, which is also bidirectional, commonly connecting to the arithmetic control unit with at least another input/output unit, and a bus control means which is provided in the arithmetic control unit and controls data transfer between two units connecting to the second bus. The information processing system uses various units connecting to the first and second buses in time sharing and multiplexing mode.

10 Claims, 28 Drawing Figures

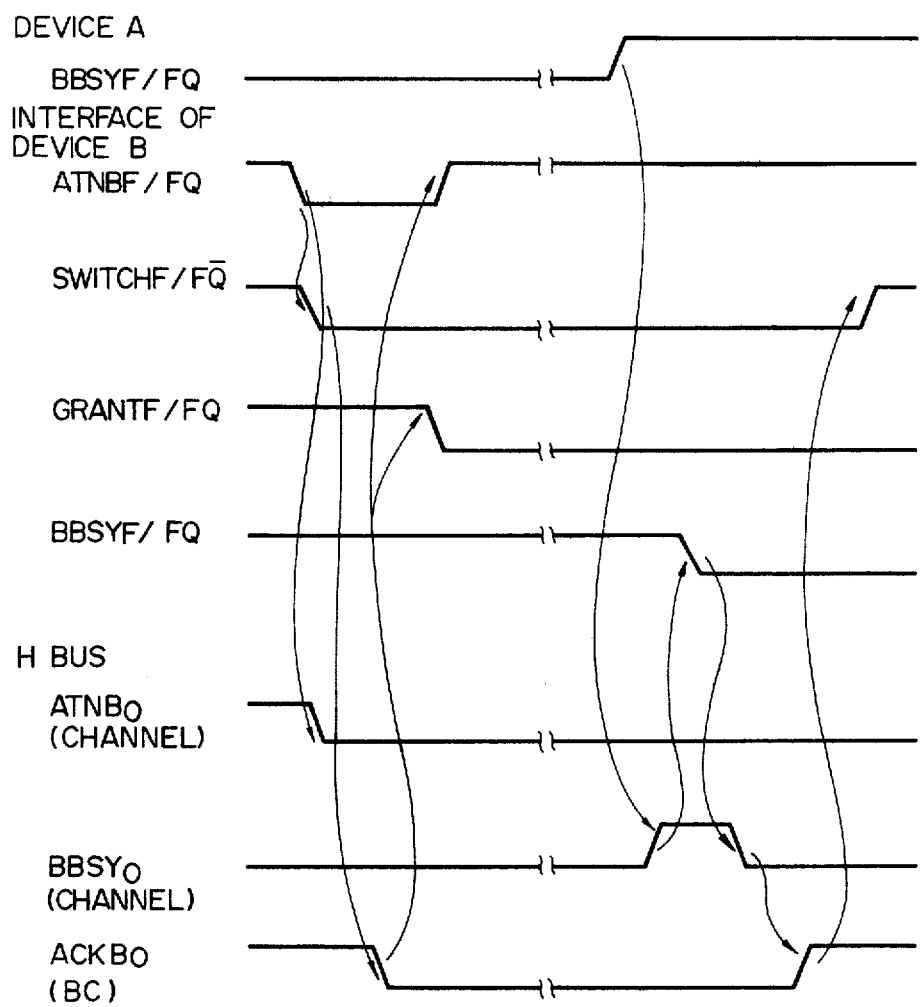
F I G. 12

F I G. 23
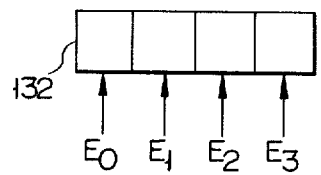
| | $E_0$ | $E_1$ | $E_2$ | $E_3$ |
|---|---|---|---|---|
| $F_0$ | 1 | 1 | 1 | 1 |
| $F_1$ | 1 | 1 | 0 | 0 |
| $H_0$ | 1 | 1 | 0 | 0 |
| $H_1$ | 0 | 0 | 1 | 1 |
| $B_0$ | 0 | 0 | 0 | 1 |
| $B_1$ | 0 | 0 | 0 | 1 |
| $B_2$ | 0 | 0 | 0 | 1 |
| $B_3$ | 0 | 0 | 0 | 1 |
F I G. 24
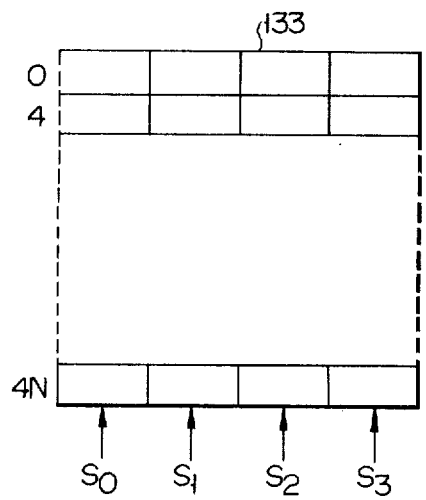
| | $S_0$ | $S_1$ | $S_2$ | $S_3$ |
|---|---|---|---|---|
| $F_0$ | 1 | 1 | 1 | 1 |
| $F_1$ | 0 | 0 | 1 | 1 |
| $H_0$ | 1 | 1 | 0 | 0 |
| $H_1$ | 0 | 0 | 1 | 1 |
| $B_0$ | 1 | 0 | 0 | 0 |
| $B_1$ | 0 | 1 | 0 | 0 |
| $B_2$ | 0 | 0 | 1 | 0 |
| $B_3$ | 0 | 0 | 0 | 1 |

INFORMATION PROCESSING SYSTEM

BACKGROUND OF THE INVENTION

The invention relates to an information processing system in which architecture is employed which separates a bus controller and a memory controller from the central processing unit, thus improving system throughput.

There have been proposed many types of data transfer systems connecting, for data processing, various units in an information processing system such as a main memory, a central processing unit, and a plurality of input/output units.

One form of such data transfer system is shown in FIG. 1. The information processing system shown in FIG. 1 includes a memory bus 3 connecting an arithmetic control unit (ACU) 1 and a plurality of memory units M1 to Mn designated by reference numeral 2, a direct memory access (DMA) bus 5 connecting the ACU 1 and a plurality of input/output units I/O1 to I/On designated by reference numeral 4, and an input/output bus 6. The ACU 1 inputs address data and a control signal through the memory bus 3 to one of the memory units 2 to access the memory unit. The ACU 1 issues an input/output control signal (an address command interrupt signal) to one of the input/output units 4, through the input/output bus 6. The input/output unit 4 responds to the input/output control signal from the ACU 1 to transfer an address data control signal to one of the memory units 2 by way of the DMA bus 5. The information processing system in FIG. 1 is so constructed that the memory bus 3, the DMA bus 5 and the input/output bus 6 are all controlled by the ACU 1. For this, the logic circuitry of the ACU 1 is complex. Additionally, the operations of the respective bus controls and the ACU 1 are conducted in series mode so that the throughput of the system is restricted.

Another example of the type of data transfer system in question is illustrated in FIG. 2. The data transfer system in FIG. 2 is the so-called common bus system in which a plurality of memory units M1 to Mn designated by reference numeral 11 and a plurality of input/output systems I/O1 to I/On designated by reference numeral 12 are connected by a common bus 13. In this system, the ACU 14 controls the common bus 13, and the necessary control signals are all transferred through the common bus 13. This type of data transfer system is disclosed for example in U.S. Pat. No. 3,710,324. This system, however, has the disadvantage that, because of the restriction of bus occupation, which limits the transfer rate, system throughput is restricted particularly in a relatively large scale system.

SUMMARY OF THE INVENTION

Accordingly, an object of the invention is to provide an information processing system employing an inventive architecture in which two individual buses are used and a bus control provided for one of the buses is separated from the ACU.

Another object of the invention is to provide an information processing system in which units connected to two buses are used in a time sharing and multiplexing mode whereby use of high efficiency bus protocol, addressing, data transfer, and interrupt controls are possible.

Still another object of the invention is to provide an information processing system in which a bus control means for controlling buses is provided with improved error checking means and zone control means, thereby improving the system throughput.

An additional object of the invention is to provide a multiprocessing system with all the functions mentioned above.

According to the present invention, there is provided an information processing system having a main memory, an arithmetic control unit and a plurality of input/output units, comprising a first bidirectional bus commonly connecting the main memory, the arithmetic control unit, and at least one input/output unit, a bus controller for controlling data transfer between two units connected to the first bus, a second bidirectional bus connecting the arithmetic control unit to at least another input/output unit, and bus control means provided in the arithmetic control unit for controlling data transfer between two units connected to the second bus.

Other objects and features of the invention will be apparent from the following description taken in connection with the accompanying drawings, in which:

BRIEF DESCRIPTION OF THE DRAWINGS

FIGS. 11 and 12 are timing diagrams useful in explaining the operation of the bus attaining circuit of FIG. 8;

FIGS. 23 and 24 are block diagrams illustrating zone control operation when read an operation or a write operation are conducted from the main memory unit;

DESCRIPTION OF THE PREFERRED EMBODIMENTS

Figure 3:
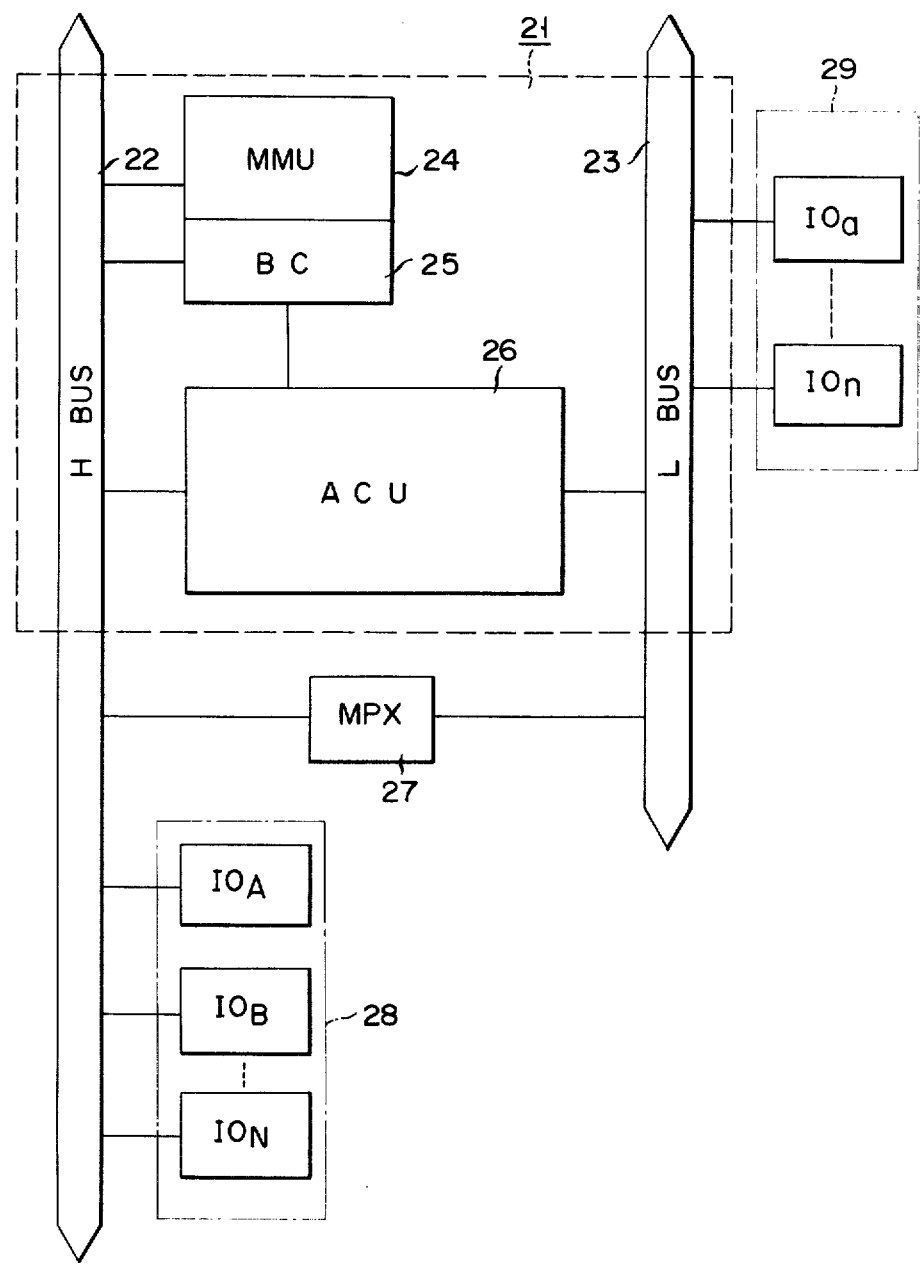
FIG. 3 shows a block diagram of an information processing system according to the invention wherein there is illustrated the general interconnection among circuit components of the information processing system.

Referring now to the drawings, and particularly to FIG. 3, there is in block form shown an information processing system according to the invention. As shown, a central processing unit (CPU) 21 comprises a main memory unit (MMU) 24, a bus controller (BC) 25, and an arithmetic control unit (ACU) 26. In order to cause a high efficient input/output operation, ACU 26 is provided with two buses; a high speed bus 22 (referred to as an H bus) and a low speed bus 23 (referred to as an L bus). The H bus, for example, employs 32 signal lines (32 bits) and is capable of performing data transfer at high speeds. The H bus 22 is connected to the main memory unit 24 via the bus controller 25, and to the arithmetic control unit 26. The H bus 22 also is connected to a high speed input/output multiplexer (MPX) 27 and a plurality of input/output units I/O$_A$ to I/O$_N$ 28. The L bus 23, which is provided independently of the H bus 22, consists of 8 signal lines (8 bits) (or 16 signal lines (16 bits)), for example, and is capable of performing a low speed data transfer. The L bus 23 is connected to the ACU 26 and a plurality of input/output units I/Oa to I/On generally designated by numeral 29. The L bus 23 also is connected to the high speed input/output multiplexer (MPX) 27. The L bus 23 is of the bidirectional type alowing data transfer between units connected to the bus and is controlled by the ACU 26. The input/output units 29 provides multiplexed input/output control under control of the ACU 26 or the MPX 27 externally connected to the H bus 22.

Figure 1:
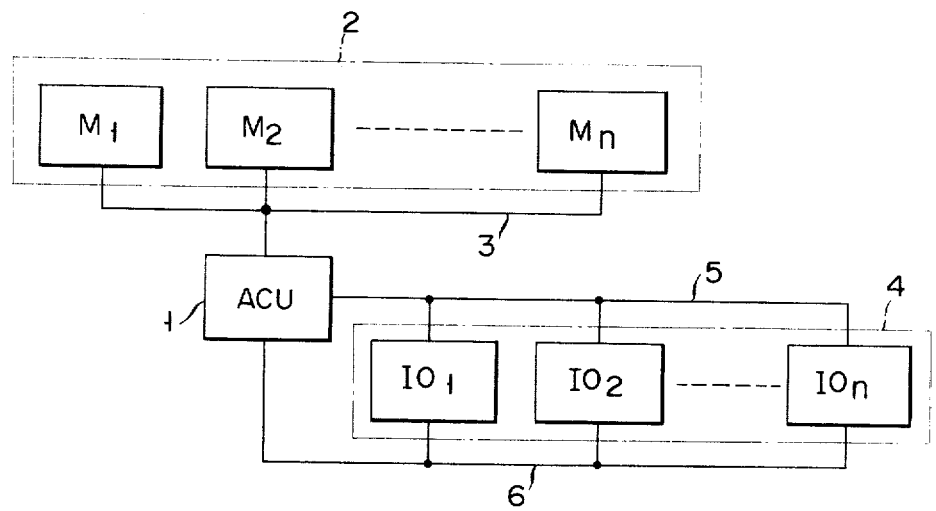
FIG. 1 shows a schematic diagram of a conventional information processing system.
Figure 2:
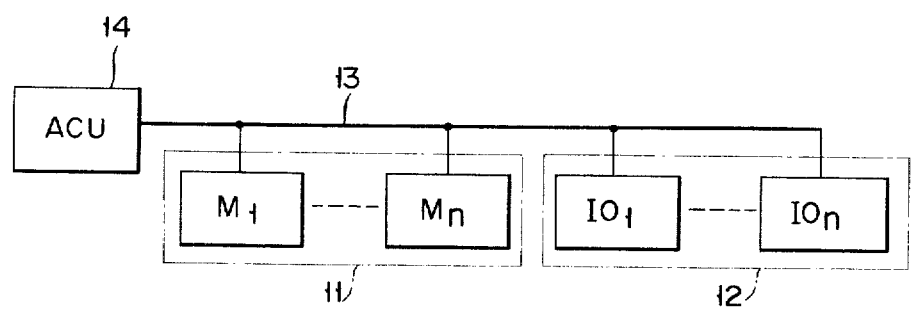
FIG. 2 shows a schematic diagram of another conventional information processing system.
Figure 4:
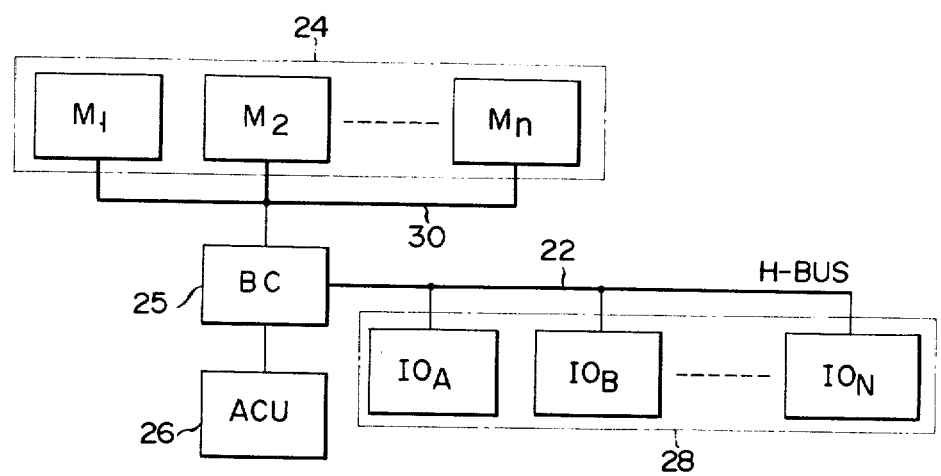
FIG. 4 shows a schematic diagram of a conventional information processing system viewed from another aspect.

FIG. 4 is used to comparatively illustrate the circuit components of the information processing system of the invention in relation with those employed with the prior art systems of FIG. 1 and FIG. 2, and illustrates in block form components comparable to those connected to the bus controller (BC) 25 in FIG. 3. Accordingly, like numerals are used to designate like portions in FIG. 3. In FIG. 4, a plurality of memories (Ml to Mn) 24 are connected to the BC 25 by a memory bus 30. Incidentally, the memory bus 30 is not illustrated in FIG. 3. The input/output units 28 denoted as I/O$_A$ to I/O$_N$ are connected to the bus controller 25 through the H bus 22. The ACU 26 is directly connected to the bus controller 25. The input/output units 29 denoted as I/Oa to I/On and the high speed multiplexer 27 both being connected to the L bus 23, are not employed in the prior art system of FIG. 4.

Figure 5:
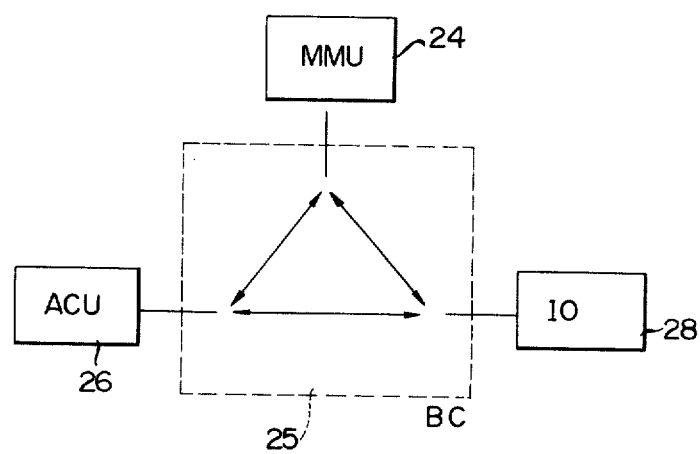
FIG. 5 schematically illustrates the function of the bus controller according to the invention.

FIG. 5 schematically illustrates the functional concept of the bus controller 25 as used in the present invention. When the arithmetic control unit 26 accesses the main memory unit 24, the ACU 26 feeds a memory address and a control signal to the bus controller 25. Similarly, when the input/output unit 28 accesses the main memory unit 24, the I/O unit 28 feeds a memory address and a control signal to the bus controller 25. The bus controller 25 has a priority control function for determining which unit obtains control of the bus, the arithmetic control unit 26 or I/O device 28. In this example, the bus controller 25, in order to give the higher priority to the input/output unit 28, drives MMU 24 and responds to the I/O unit 28. As a matter of course, the priority may be given to the arithmetic control unit 26. When the arithmetic control unit ACU 26 transfers the control signal to the input/output unit 28 or when the ACU 26 receives a response signal from the input/output unit 28, data transfer therebetween is performed through the bus controller 25.

From the foregoing description, it will be understood that the information processing system of the invention has the following features.

First, control of the H bus 22 and access control of the memory unit 24 are conducted by the bus controller 25 independently and not through the arithmetic control unit 26.

Second, since a bus division system for separate H and L buses is employed, various kinds of units on the H and L buses may be used in time shoring and multiplexing mode.

Third, when the H bus 22 is linked by a computer system link device, the computer system may easily be expanded in its function and size to a complex computer system. The complex computer system will subsequently be described in detail.

The description to follow is the details of the respective units in the information processing system according to the invention.

Figure 6:
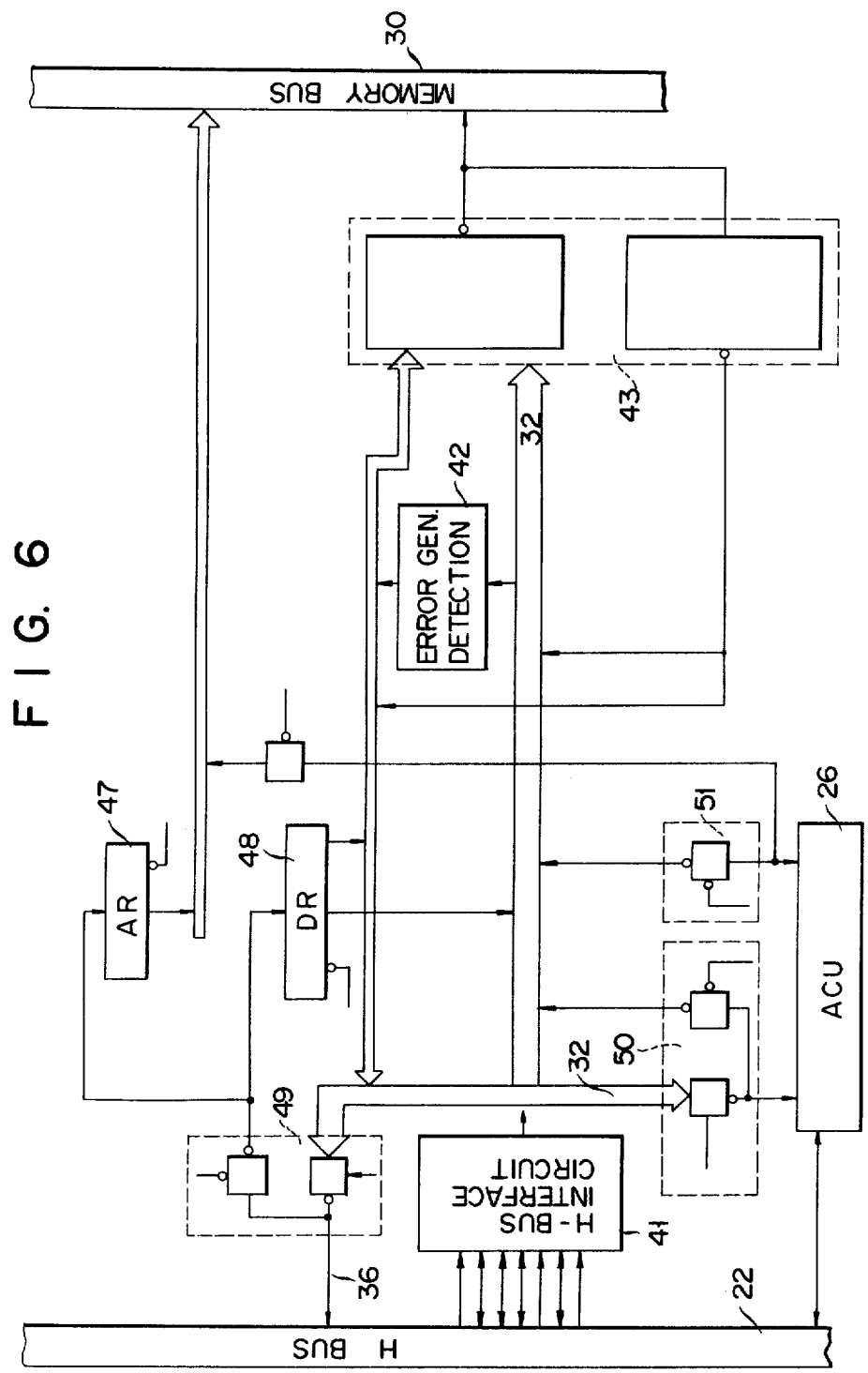
FIG. 6 shows a block diagram of the bus controller according to the invention.

Referring now to FIG. 6, there is shown a circuit diagram of the bus controller 25. FIG. 6 also shows the H bus 22, the arithmetic control unit 26 and the memory bus 30. The bus controller (BC) 25 further includes an H bus interface circuit 41, an error detector 42, a zone controller 43, and address register 47, a data register 48, a line driver/receiver 49, a data driver/receiver 50, and an address driver 51.

Figure 7:
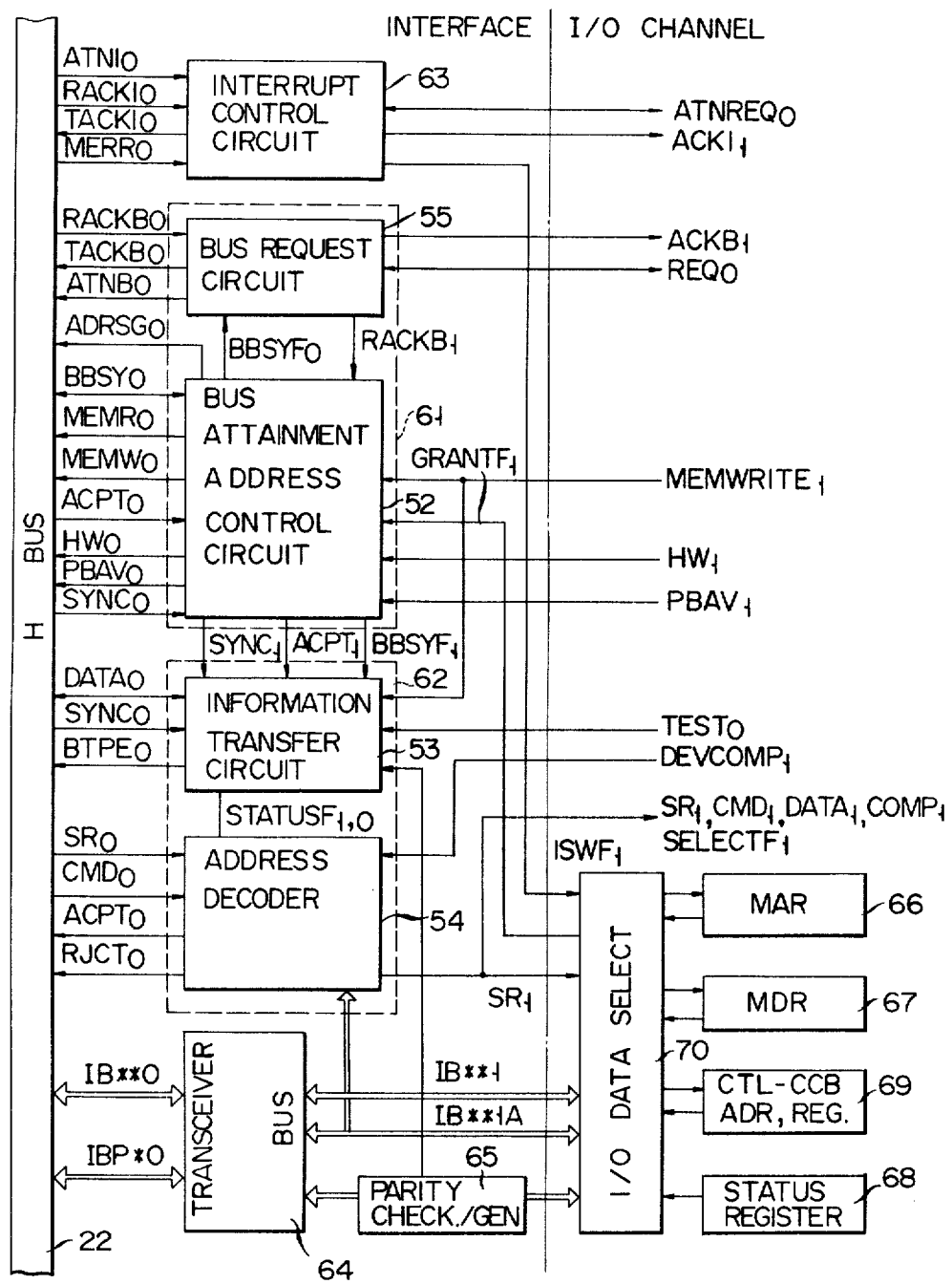
FIG. 7 shows a block diagram of an H bus interface circuit used in the controller of FIG. 6.

FIG. 7 illustrates the details of the H bus interface circuit 41 of FIG. 6. In FIG. 7, an interrupt control circuit 63 interrupts the ACU when it receives a request from the input/output controller (not shown) or when there occurs a memory error. A bus attainment circuit 61, which includes a bus request circuit 55 and a bus attainment address control circuit 52, feeds a slave address to couple the master with a slave. A data transfer control circuit 62, which comprises a data transfer circuit 53 and an address decoder 54, controls the operation of either master or slave. In a master mode, it transfers the contents of the data register to the main memory unit MMU. In a slave mode, it transfers a channel control block and a status signal. The H bus interface 41 is comprised of a bus transceiver 64, a parity checker/generator 65, an memory address register 66, a memory data register 67, a status register 68 for storing status of the units, a CCB buffer 69 for storing a channel control block (CCB), and an input/output data selector 70. The details of the above-mentioned circuits will be described with reference to FIG. 8 and its succeeding figures. The classification of various signal lines and the names of signal lines are tabulated in Table 1.

Input/output signals from the information lines and the control lines shown in Table 1 will be discussed below. Output signals IB$_{00}$ to IB$_{31}$ from the information line indicate data with the bus width of 32 bits (4 bytes). The output signals IBP0 to IBP3 indicate parity check bits corresponding to each byte of the data from the information line.

Input/output signals from the bus attainment control lines will be given below.

TABLE 1

| Classification | Signal LINE Name | | Input/output Signal shown in FIG. 7 |
|---|---|---|---|
| Information Lines | Information Bus | 00 to 15 | IB00 - 15 |
| | | 15 to 31 | IB16 - 31 |
| | I.B. Parity | 0 | IBP0 |
| | | 1 | IBP1 |
| | | 2 | IBP2 |
| | | 3 | IBP3 |
| Bus Attainment Control Lines | Attainment Bus | | ATNB |
| | Acknowledge Bus | | ACKB |
| | Bus Busy | | BBSY |
| | Accept | | ACPT |
| | Wait | | WAIT |
| | Reject | | RJCT |
| Operation Designation Information Line | Memory Read | | MEMR |
| | Memory Write | | CMD |
| | Command | | MEMW |
| | Status Request | | SR |
| | Data Available | | DATA |
| Data Transfer Control Line | Synchronous | | SYNC |
| | Half Word | | HW |
| | Parity Avalilable | | PBAV |
| Interrupt Control Line | Attainment Interrupt | | ATNI |
| | Acknowledge Interrupt | | ACKI |
| System Control Line | Primary Power Fail | | PPF |
| | System Clear | | SCLA |
| | Bus Transmission Parity Error | | BTPE |
| | Memory Error | | MERR |
| | Bus Stall | | BSTL |

A signal ATNB is a request signal which is used when a unit (for example, an input/output unit I/O) to be a master obtains the control of the H bus (22). The signal ACKB is an answer back signal from the bus controller BC responsive to the ATNB signal. The acknowledge signal ACKB permits the unit with the highest priority level to obtain control of the H bus 22. A bus busy signal BBSY is an interlock signal to allow the unit as a master on the H bus 22 to keep a right to use the bus 22. Accordingly, so far as the BBSY signal maintains the state of "1", no other units on the H bus are capable of becoming a master. ACPT, WAIT, and RJCT signals are answer back signals from the slave when the master on the H bus 22 transfers the slave address. When the ACPT signal is transferred from the slave, it means that the slave is in operative condition and the use of the bus is permitted. When the signal transferred from the slave is the WAIT signal, the slave is operating so that instructions other than the test instructions are rejected and kept waiting. In the case of the RJCT signal, the slave is in inoperative condition and the bus request is rejected (this occurs when the system is trouble or the unit is unloaded).

The description to follow is input/output signals from the operation designating lines. Signals MEMR and MENW are used when a master unit requests data transfer to and from the unit (memory unit) serving as a slave. That is, when the MEMR signal is "1", it designates the read operation from the unit as slave. When the MEMW is "1", it designates the write operation to the units as slave. When the unit as master transmits the MEMR or MEMW signal together with the ATNB signal, and receives the ACPT signal from the slave unit, then the MEMR or MEMW signal is reset. The signal CMD is used when the arithmetic control unit 26 executes the start input/output instruction for the channel. When the arithmetic control unit ACU transmits the CMD signal simultaneously with the ATNB signal and receives any one of the ACPT, WAIT, and RJCT from the channel the CMD signal is reset. The respective signals such as ACPT, WAIT, and RJCT from the channel are the same functional signals as those described above.

Signals transferred through the data transfer control line will be given below. The DATA signal is used when the master informs the slave of the effective timing of bus information or vica versa during the period of data transfer. The SYNC is an answer back signal to the DATA signal. After the DATA signal is strobed, the SYNC signal is "1" and it is confirmed that the DATA signal is "0". Then, the SYNC signal becomes "0". The signal HW is used to designate the bit rate of data transfer in such a manner that, when the signal HW is "1", the data transfer rate is 16 bits, and when the signal HW is "0", the data transfer rate is 32 bits. The signal PBAV indicates whether the parity bits is effective or not when the data is transferred. That is, when the PBAV signal is "1", the parity bit is effective, and when the signal PBAV is "0", the parity bit is void.

The input/output signals from the interrupt control lines will be given. The ATNI is a signal used when respective units make an interrupt request for the arithmetic control unit 26. When receiving the ATNI signal, the arithmetic control unit 26 requests control of the H bus (22) and then when it gains control, it produces the ACKI signal to be described later. When the ACKI signal reaches the unit which made the request, the ACU 26 transfers the interrupt information to the units on the bus through the information line and sets the signal DATA "1", and the ATNI signal "0". The signal ATNI may be transferred immediately after the interrupt request occurs. The ACKI is an answer back signal from the ACU when the interrupt request by the signal ATNI is accepted by the unit 26. When the unit that issued the signal ATNI receives the signal ACKI, then the unit issues the interrupt information and the signal DATA.

Input/output signals through the system control lines will be described below. PPF is a signal for detecting a power failure. When the units on the H bus (22) receive the signal PPF, they perform necessary processing in preparation for the coming power failure. The SCLA is an initializing signal issued when the power source is turned on or off or when the console or the like is operated. The BRPE is a signal representing an H bus transfer parity error. The MERR is a signal indicating an error in the memory unit. The BSTL is a bus stall signal. These signals detect a system fault caused by hardware trouble.

Before describing the details of the circuits, it should be understood that since the embodiment of the invention employs a common bus system, the arithmetic control unit, the main memory unit, and the input/output units are indistinguishable on the common bus line, that is, each of these units are capable of becoming the master or the slave, and therefore data transfer is possible from one unit to another.

Figure 17:
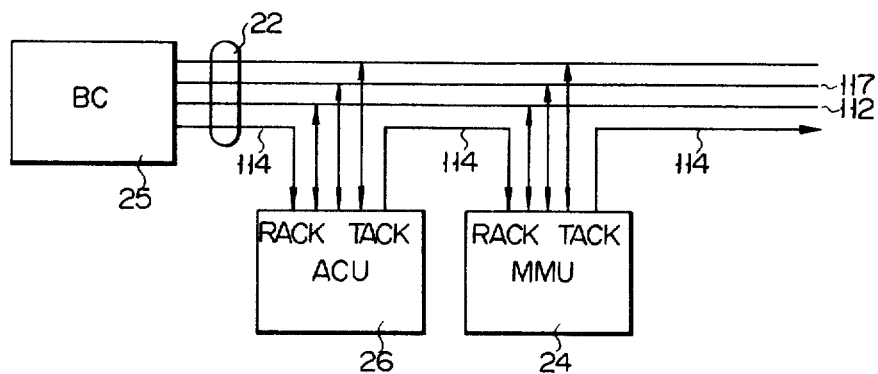
FIG. 17 is a block diagram illustrating the basic operation of the information processing system in which a bus interrupt is conducted.

This will be explained by using the bus interrupt system illustrated in block form in FIG. 17. In the figure, a unit which performs data transfer issues a bus use request to the bus controller 25 through a bus use request line 112. Upon receipt of the signal, the bus controller 25 checks as to whether the H bus 22 is being used or not. When the bus is not used, the bus controller 25 issues a use-permissible signal to the unit having transferred the bus use request, through a bus use permission line 114. The permission signal is first transferred to the arithmetic control unit 26 and then is transferred to the main memory unit 24. In this manner, the permission signal is transferred to the respective units in daisy chain manner so that a conflict of the bus requests from the respective units is avoidable.

The unit which is granted use of the bus becomes the master and has a right to exclusively use the H bus. Then, it transfers a unit address to the slave unit through the information line 117. All the units on the H bus 22 have their own unit addresses. For this, when the master designates a unit address, the corresponding unit becomes the slave. When data transfer is completed between the master and the slave, the master releases the H bus.

Figure 8:
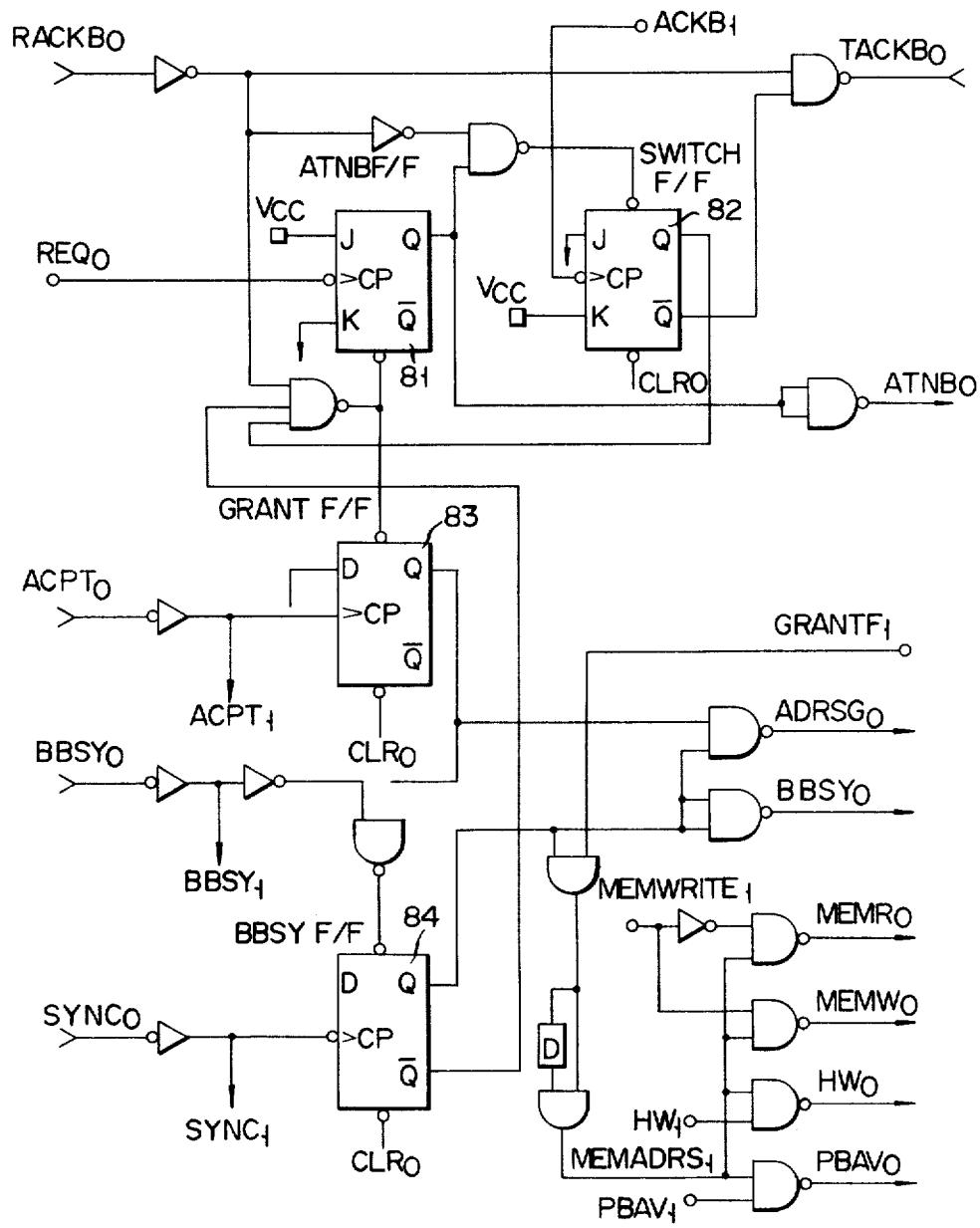
FIG. 8 shows a block diagram of the bus attaining circuit shown in FIG. 7.

Turning now to FIG. 8 and succeeding Figs., let us consider the construction and operation of the various cricuits shown in FIG. 7.

Figure 11:
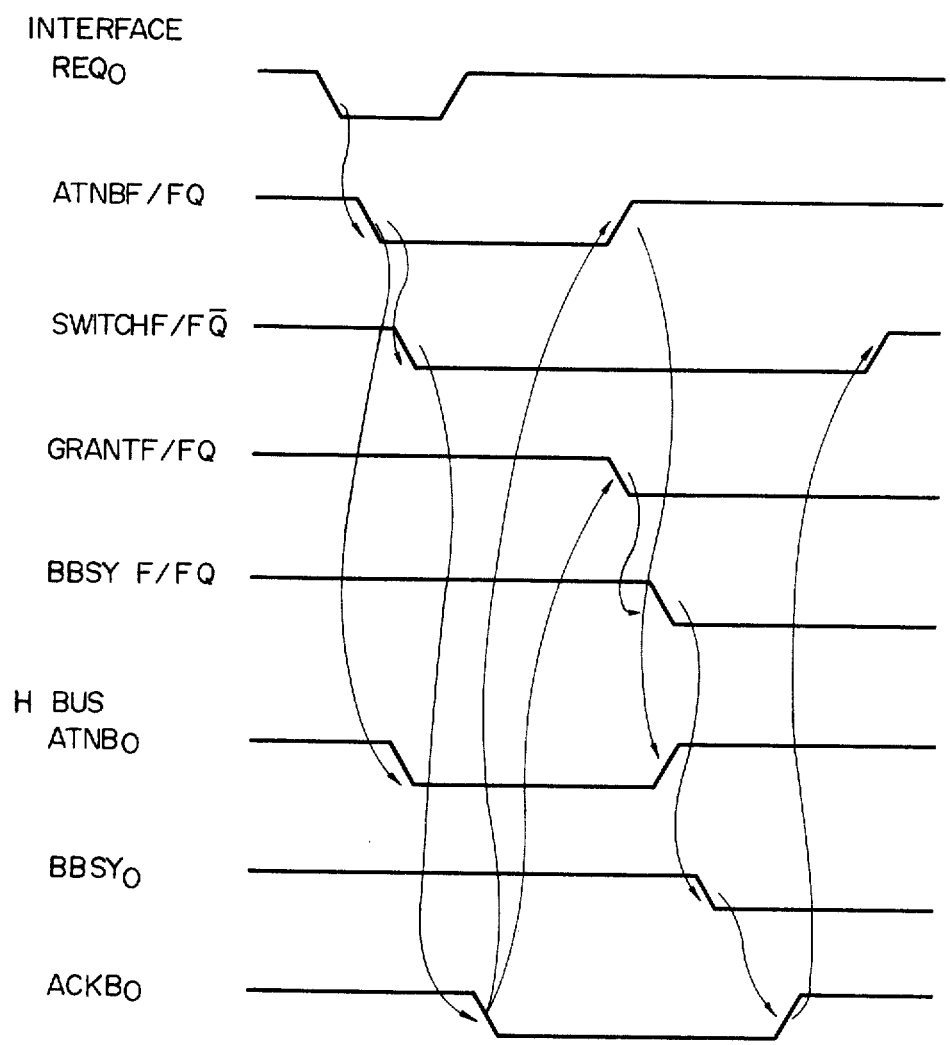

FIG. 8 shows a block diagram of the bus attainment circuit 61 of FIG. 7. FIG. 11 is a timing diagram illustrating the operation when there occurs a bus request during the release of the H bus 22. FIG. 12 shows timing diagrams illustrating the operation when there occurs a bus use request during the use of the H bus. The attainment circuit shown in detail in FIG. 8 is comprised of a bus use request circuit 55 (FIG. 7) and a bus address control circuit 52 and transmits a slave address to couple the master with the slave, as previously described.

The case where a bus use request occurs during the release of the H bus will be discussed with reference to FIGS. 8 and 11. In the explanation to be given, the input/output unit I/O accesses the main memory unit MMU. That is to say, the input/output unit is the master and the main memory unit is the slave. This is true when the master is the arithmetic control unit. Before the input/output unit (referred to as master) accesses the memory unit (referred to as slave), the master issues an operation request signal REQ to the bus controller BC, as described relating to FIG. 5. Upon receipt of the REQ signal, the bus controller BC triggers an ATNB flip-flop 81 (FIG. 8) and sets it. The REQ signal is temporarily stored in the ATNB flip-flop 81 and the flip-flop produces at its output an ATNB signal to informs the ATNB signal line of the H bus that there occurs a request to gain the control of the H bus. At the same time, the output of the ATNB flip-flop resets a SWITCH flip-flop 82. The SWITCH flip-flop 82 produces at its Q̄ output an acknowledge signal, i.e. ACKB signal (in FIG. 8, it is expressed TACKB and RACKB), of the bus controller BC, thereby to inform the ACKB signal line of the H bus that H bus control has been obtained, The ACKB signal is connected to the respective units in chain manner so that the input signal is denoted as RACKB and the output signal as TACKB. The chain connection of configuration will be detailed in FIG. 17. The ATNB flip-flop 81 is cleared at the trailing edge of the RACKB signal. Simultaneously, a GRANT flip-flop 83 is set by the RACKB signal. The GRANT flip-flop 83 stores the fact that the H bus attainment request is granted. The Q output of the GRANT flip-flop 83 sets the BBSY flip-flop 84. When the BBSY flip-flop 84 is set, it issues the BBSY signal onto the H bus. The BBSY signal of the H bus indicates the fact that the H bus is used exclusively by the master. After the BBSY signal is transferred, the ACKB signal falls off and, at the trailing edge of the ACKB signal, the SWITCH flip-flop 82 is set. The above operation is fully illustrated in FIG. 11. Thus, when the H bus is released the bus attainment request from the master is granted, the use of the H bus is granted and data transfer is conducted between the master and slave. The GRANT flip-flop 83 is cleared at the trailing edge of the ACPT signal from slave. The BBSY flip-flop 84 is cleared at the point in time that its operation as master terminates, i.e. at the trailing edge of the SYNC signal.

Another case where, when the H bus is exclusively used by a unit A, a unit B issues an H bus attainment request, will be discussed with reference to FIG. 12. In this example, the interface operation of the unit B is much the same as that in FIG. 11. However, in this example, the unit A first uses exclusively the H bus so that the BBSY flip-flop 84 continues its set state. And when the BBSY signal becomes low level by the unit A and the H bus is released, the H bus attainment request is accepted. Then, the H bus is exclusively used by the unit B as in the case of FIG. 11. Incidentally, when the BBSY flip-flop 84 is set, the GRANT flip-flop 83 is necessarily set and hence a slave address signal ADRSG is issued.

Figure 13:
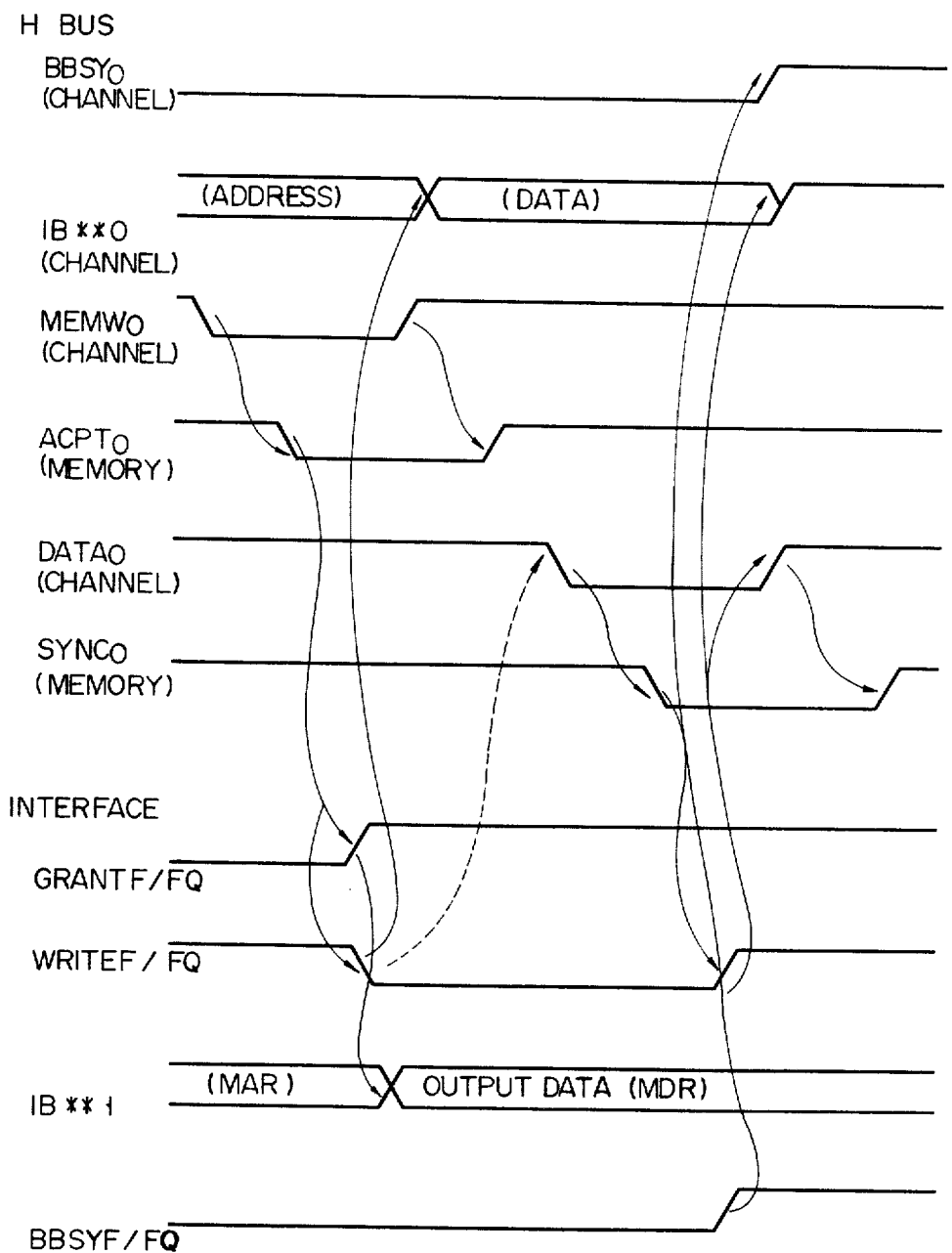
FIGS. 13 through 15 show timing diagrams useful in explaining the operations of the information transfer control circuit and address decoder.
Figure 14:
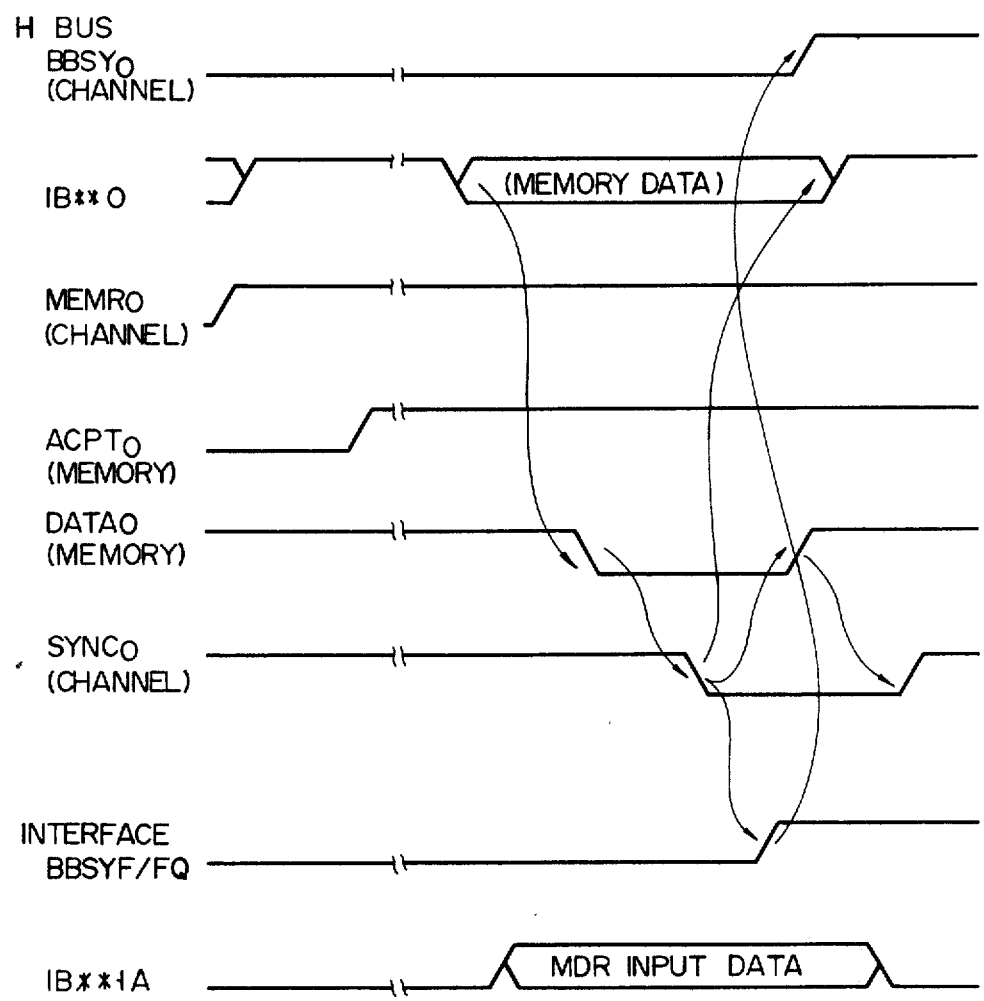
Figure 15:
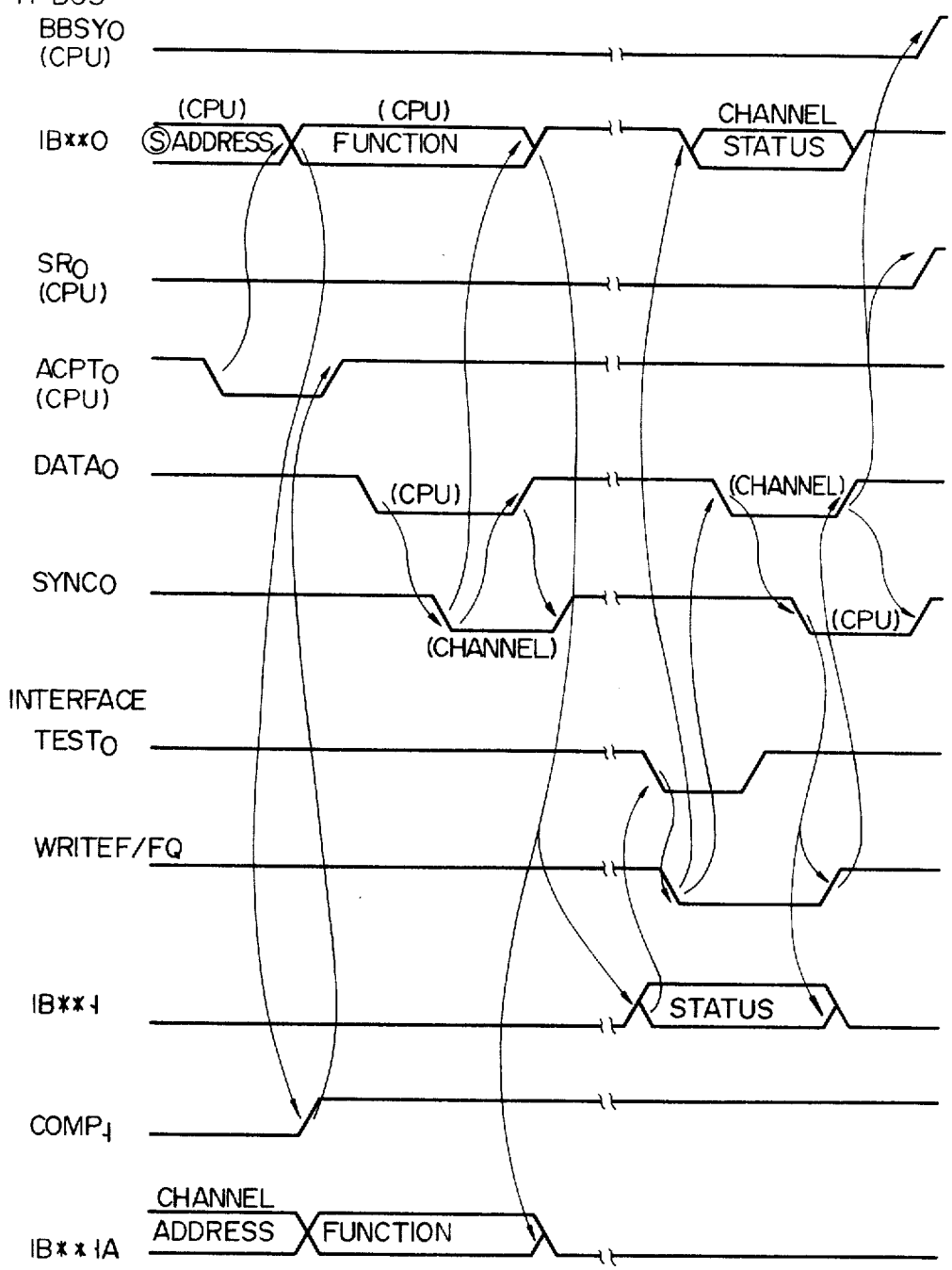

The information transfer circuit 53 and the address decoder 54 in the H bus interface in FIG. 7 will be described with reference to FIG. 9. FIG. 13 is a timing diagram illustrating the data transfer from the input-/output unit (or channel) to the memory unit. FIG. 14 is a timing diagram illustrating the data transfer from the memory unit to the input/output unit (or channel). FIG. 15 shows a timing diagram illustrating the operation of a test input/output instruction for transferring data between the arithmetic control unit and the input/output unit (or channel).

As described above, the information transfer circuit controls the operation of either master or slave and therefore the contents of the control is different between master and slave. The address decoder 54 operates as the slave to decode and compare a channel address so that it transfers the ACPT or RJCT signal to the master, relating to the SR and CMD signals.

Figure 9:
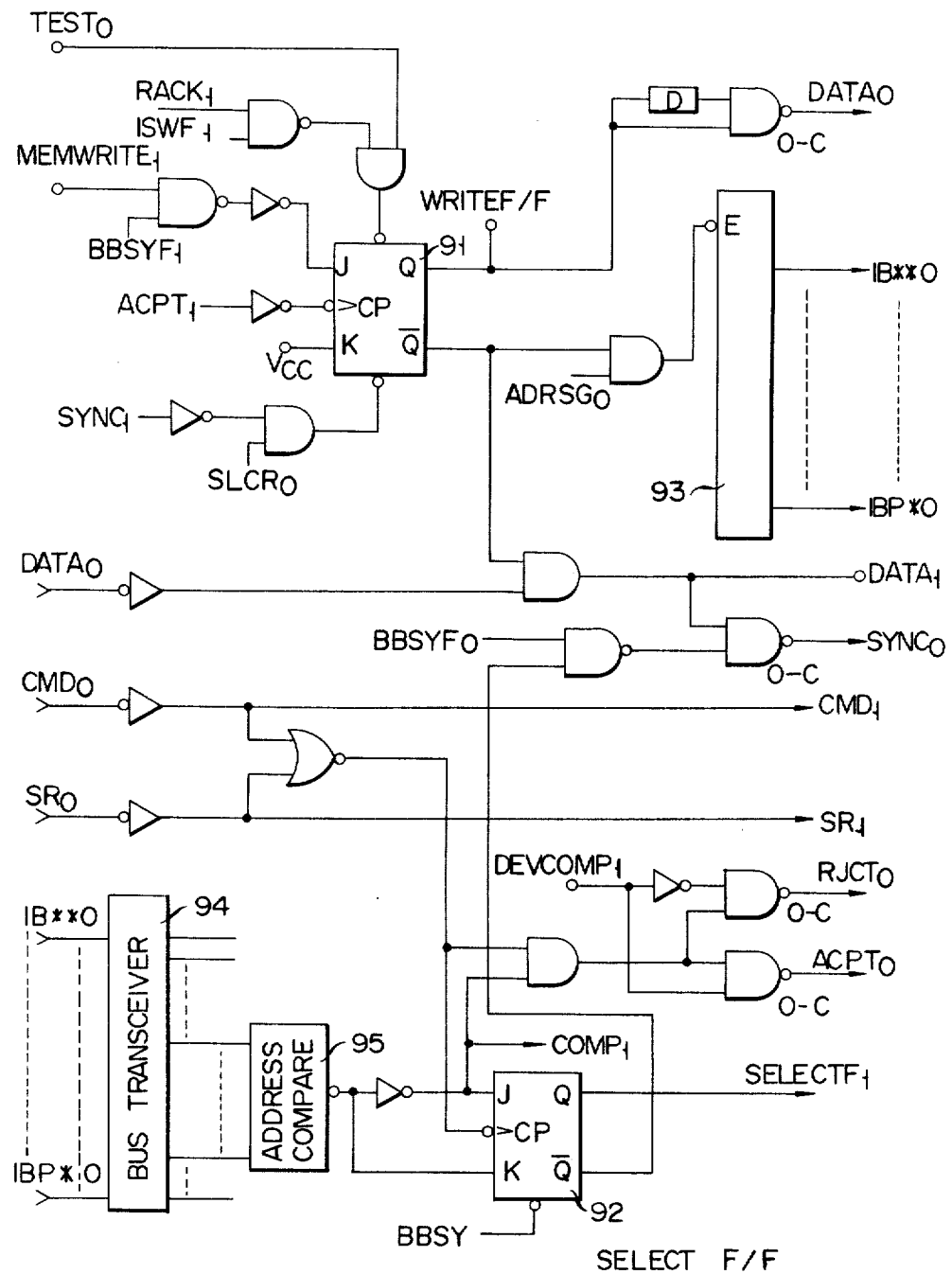
FIG. 9 shows a circuit diagram including the information transfer control circuit and an address decoder circuit of FIG. 7.

In FIG. 9, the WRITE flip-flop 91 controls the transfer of the data directed to the device on the H bus. The WRITE flip-flop 91 is reset at the leading edge of the ACPT signal when the BBSY flip-flop (84 in FIG. 8) is set and the WRITE signal is at a high level or when the master provides a designation of MEMORY WRITE. The WRITE flip-flop 91 is set when and a TEST signal is at the low level. The WRITE flip-flop 91 is set at the time the RACK signal is received, when the transfer of a channel control block address is designated and when the ATNI flip-flop (see FIG. 10) is set. The flip-flop 91 is reset when receiving the SYNC signal. The SELECT flip-flop 92 in FIG. 9 stores the information that a device is designated as the slave. The select flip-flop 92 is set at the trailing edge of the SR signal or the CMD signal, when it is designated as the slave and receives the SR signal or the CMD signal. When the H bus is released, it is cleared.

Data transfer control from an input/output unit (or channel) to the main memory unit will be described with reference to FIG. 13. The input/output unit operates as the master and has already checked as to the release of the H bus. Before the data transfer, the write address of the main memory unit is transferred to the H bus. At this time, the WRITE flip-flop 91 is set at the trailing edge of the MEMORY WRITE signal and the ACPT signal. Simultaneously, the GRANT flip-flop 83 also is set. As a result, the write address of the input/output unit (or channel) is loaded into the memory address register 47 (FIG. 6). Then, by the DATA signal when the WRITE flip-flop 91 is set, data from the input/output unit (or channel) is transferred to the H bus. The data is loaded into the data register 48 shown in FIG. 6. After a short time since the DATA signal is generated, the WRITE flip-flop 91 is cleared at the trailing edge of the SYNC signal. Simultaneously with the clearing operation, the address and data of the address register 47 and the data register 48 are transferred to the main memory unit MMU through the memory bus 30, then the data is written at location of MMU designated by the address. At the instant that the write operation is ended, the master sets the BBSY signal at the low level and releases the H bus. After a short time since the WRITE flip-flop 91 is cleared, the DATA signal and the SYNC signal return to the original state.

FIG. 14 shows a set of waveforms illustrating a data transfer operation from the main memory unit to the input/output unit (or channel). The operation is similar to that in FIG. 13 except that the main memory unit operates in READ mode.

Reference is now made to FIG. 15 for explaining test input/output instructions between the arithmetic control unit and the input/output unit (or channel). In operation, the arithmetic control unit serves as master and the input/output unit (or channel) as slave. Before data is transferred to slave, the master obtains the H bus. The master transfers a slave address to the slave and waits a response therefrom. When receiving an accept signal ACPT indicating "usable" from slave, the test input/output instruction is executed. The ACPT signal disappears when the comparison of the salve address with the unit address of the slave is completed. In the course of execution of the test input/output instruction, the H bus receives a DATA signal representing timing signals effective for the H-bus information (function) transferred from master to slave. Further to the H bus is delivered a SYNC signal which is a response to the DATA signal. After the data exchange, the status information is sent out onto the H bus. A TEST signal sets the WRITE flip-flop 91. In the status information transfer, the timing signal and the DATA signal are delivered to make the H-bus information effective. Further, the SYNC signal which is a response signal for the DATA signal is returned to the H bus and then the transfer of the status information is completed. The WRITE flip-flop 91 is reset when it receives the SYNC signal. As seen from the foregoing, in the course of the test input/output instruction execution, the slave receives the function from the master and then sets the WRITE flip-flop 91 and finally transfers the status information.

Figure 10:
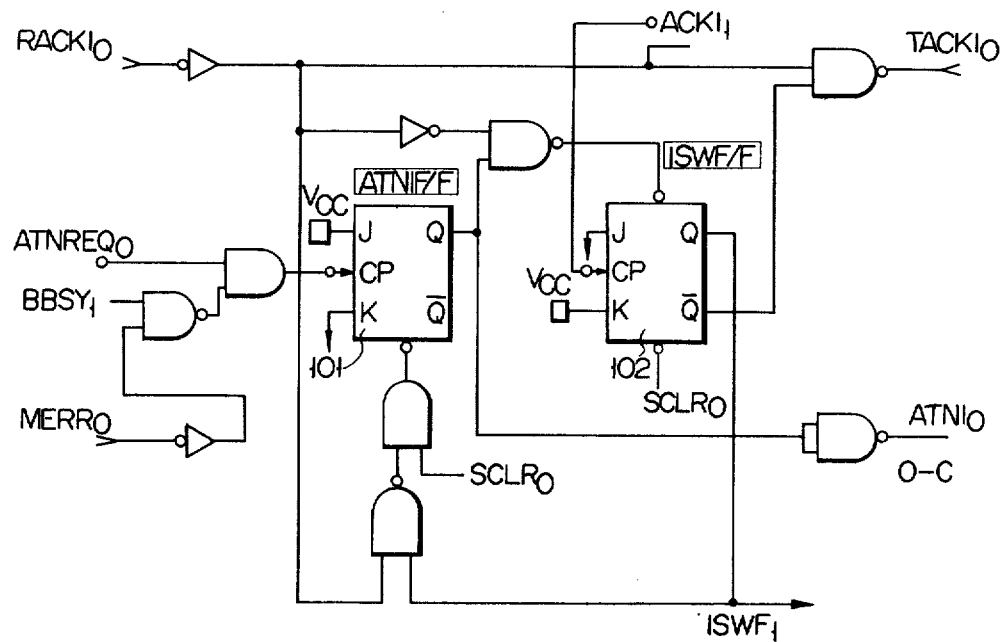
FIG. 10 shows a circuit diagram of the interrupt control circuit the FIG. 7.
Figure 16:
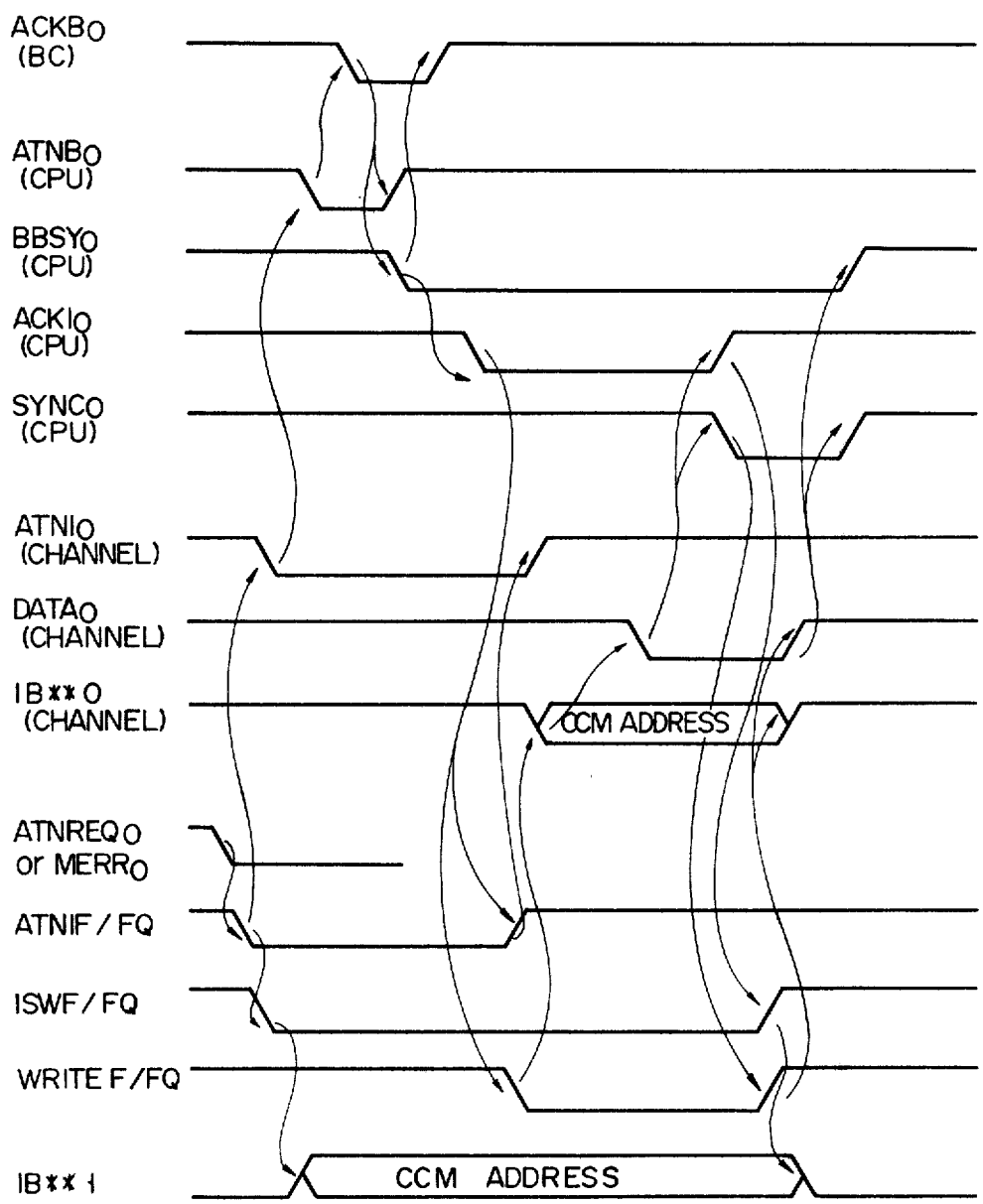
FIG. 16 shows a timing diagram illustrating the operation of the interruption control circuit shown in FIG. 10.

FIG. 10 which will be described next shows a circuit diagram of the interrupt control circuit 63 in FIG. 17. FIG. 16 is a waveform diagram illustrating its operation. The interrupt control circuit 63 forwards an interrupt to the arithmetic control unit ACU when an interrupt request is given from an input/output unit or when a memory error occurs, that is to say, a MERR signal is produced. In FIG. 10, when an interrupt request signal (ATNREQ) is received from an input/output unit, or when a memory error (MERR signal) is received, the ATNI flip-flop 101 is set. As a result, the flip-flop 101 produces the ATNI signal to the arithmetic control unit ACU and the interrupt request is granted. The ATNI flip-flop 101 is cleared by the ACKI signal (in FIG. 10 it is expressed by TACKI signal and RACKI signal). The output of the ATNI flip-flop 101 sets the ISW flip-flop 102. The $\overline{Q}$ output of the ISW flip-flop 102 reject the ACKI signal. The ISW flip-flop 102 is cleared at the trailing edge of the RACKI signal.

Interrupt processing will be described with reference to the timing diagram of FIG. 16. When the input/output unit or the input/output controller produces an interrupt request (ATNREQ) signal or a MERR signal indicating a memory error, the ATNI flip-flop 101 is set and produces an output signal of ATNI which in turn is transferred to the ACU where the interrupt request is processed for acceptance. Upon receipt of the ATNI signal representing the occurence of the interrupt, the arithmetic control unit produces and ATNB signal to gain control of the H bus. The procedure from the generation of the ATNB signal till obtaining of H bus control is described relative to FIG. 11. Incidentally, when the ATNI flip-flop 101 is set, the ISW flip-flop 102 is set. Upon receipt of a BBSY signal representing that the H bus is obtained, the arithmetic control unit completes the interrupt acceptance procedure and produces an acknowledge interrupt signal of ACKI. The ACKI signal clears the ATNI flip-flop 101 and then the ATNI signal disappears. At the same time, the ACKI signal sets the WRITE flip-flop 91 in FIG. 9 and a channel control block address is transferred. In the transfer of the channel control block address, the DATA signal giving effective timings is sent out onto the H bus and the slave sends a response signal of SYNC onto the H bus. At this time, the ACKI signal of interrupt accept simultaneously disappears. Upon disappearing of the ACKI signal and generation of the SYNC signal, the ISW flip-flop and the WRITE flip-flop are cleared and the transfer of the channel control block terminates to release the H bus. When the ATNI flip-flop 101 is set, if the ACKI signal (RACKI signal in FIG. 10) is received, the ISW flip-flop 102 is not set until the ACKI signal terminates. Accordingly, when the arithmetic control unit performs the interrupt procedure (where the ACKI signal presents), the interrupt request is kept waiting until the next interrupt process, even if the ATNI signal is generated.

The explanation to follow is the detailed logical operation of data transfer operations via the H bus. The basic operation is categorized into a bus attainment operation and a data transfer operation. A unit acting as master issues an H-bus attainment request so that the bus controller BC allots the H bus to the master. The master unit secures the H bus and then transfers a unit address to a slave unit. The unit with the corresponding unit address accepts the request and operating as a slave transfers data to the master.

The operation between the units on the H bus is classified into a master read operation (master reads out data from slave), a master write operation (master sends data to slave) and an interrupt operation. The operation, in fact, is further classified as in the following tables.

TABLE 2

| Master Read Operation | | Master | Slave |
|---|---|---|---|
| Read-out from Memory | Instruction Read-out | ACU | Memory |
| | Operand Read-out DMA Read-out | Channel | Memory |
| Test Input/output Instruction of Channel | | ACU | Channel |

TABLE 3

| Master Write Operation | | Master | Slave |
|---|---|---|---|
| Write into Memory | Operand Write | ACU | Memory |
| | DMA Write | Channel | Memory |
| Start Input/output Instruction to Channel | | ACU | Channel |

TABLE 4

| Interrupt Operation | Master | Slave |
|---|---|---|
| Read-out of Interrupt Information | ACU | Channel |

The details of the respective operations follows. The operation for attaining the H bus will first be given. When a unit on the H bus performs a reading or writing operation within the main memory unit, the arithmetic control unit ACU or the channel unit becomes the master and the main memory unit becomes the slave. In execution of the input/output instructions to the channel, the arithmetic control unit serves as master and the channel unit as slave.

A unit as master (referred to as master) issues a bus attainment request signal (ATNB signal) to the bus controller BC to check in the bus controller BC whether the H bus is being used or not. When the H bus is not used, or is released, the ACKB signal is returned to master. Upon receipt of the ACKB signal, master further checks the H bus and then sets the BBSY flip-flop 84 (FIG. 8) to be in BUSY state thereby to produce a BBSY signal which is an interlock signal to keep the right to use the H bus. The master issues a slave address indicating a desired unit to which data is to be transferred and the slave address signal is transferred along with function designating information such as MEMR, MEMW, CMD or SR signal. The slave performs a parity check of the data from the main memory unit and compares the slave address issued from the master with the unit address as slave. When the slave address and the unit address are coincident, next, it is checked whether the control unit is currently operating or not. If the result of the check shows the control unit is now operating, the WAIT signal is returned to the master and the status is set to the condition code of a program status word (PSW). When the control unit of the slave is not busy, it is checked whether it is operable or not. If it is inoperative, an interrupt by the RJCT signal is generated. On the other hand, if it is operable, the ACPT signal is produced to inform the master of "usable" status.

When the unit specified or called as slave can not quickly respond to the calling, it sends a WAIT signal back to the master. When receiving the WAIT signal, the master unit releases the H bus and, after a given period of time, issues again the bus attainment request signal to specify the unit as slave. At this time, if the unit is not busy, it return the ACPT signal to the master and data transfer is performed between master and slave.

After the bus is attained in this manner, the following operation will be conducted in accordance with the operation mode designating information. When the operation mode designation information is a MEMR signal, the master waits for data from the memory and the slave (in this case, memory) initiates its read operation. When the operation mode designation information is a MEMW signal, the master sends data to the memory and the slave (in this case, memory) waits for the data from the master. When the operation mode designation information is a CMD signal, the master (in this case, the arithmetic control unit) sends a channel code address to the channel and the channel unit (slave) waits for the channel code address from the arithmetic control unit. In the case of an SR signal for the operation, the master (arithmetic control unit) sends function data to the channel (slave unit) and waits for status, and the salve waits for the function from the arithmetic control unit and, when receiving it, sends the status.

The data transfer operation will be further detailed below. The reading operation from the memory (slave) will first be given. The slave (memory), which is called, performs a read operation parity check or EEC check and then sends a DATA signal to inform the master of the effective timings of data and H-bus information. The master which has received the DATA signal and data performs a parity check by a checker included therein and loads the data into a register and at the same time clears the BBSY flip-flop 84 (FIG. 8). Then, it sends a SYNC signal to the slave (memory) and strobes the data. After the checking operation the DATA signal becomes "0", the signal SYNC becomes low level. At this time, the BBSY signal is sent to the bus controller BC and a watch dog timer is reset.

When an error is detected in the slave (memory), a MERR signal is sent to the master and H BUS BUSY by master is cleared while at the same time the BBSY signal is transferred to the bus controller BC. The watch dog timer is thereby reset and at the same time an interrupt signal is fed to the arithmetic control unit to stop the operation of the channel unit.

The execution of the test input/output instruction to the channel will be given below.

After the H-bus is secured (the slave address is delivered), the master (ACU) delivers a test input/output function and a DATA signal to inform the slave (channel) of the data and bus information. The slave (channel) which has received the data and the DATA signal performs a parity check. Further, the slave (channel) delivers to the master (ACU) a SYNC signal which is a response signal to the status data and the DATA signal. The master (ACU) performs a parity check of the data received. Then, the master (ACU) returns a SYNC signal back to the slave (channel) and clears BUS BUSY. At the same time, it returns the BBSY signal back to the bus controller BC to clear the watch dog timer thereby to complete the test input/output instruction.

The master write operation is described as follows. The master delivers write information and the timing signal DATA to a slave. Upon receipt of the data, the slave performs a performs a parity check and enters the writing operation while at the same time it returns the SYNC signal to the master. The master clears BUS BUSY, returns the BBSY signal to the bus controller BC to reset the watch dog timer thereby terminating transfer operation.

When a parity error occurs during a data transfer, the master detects the parity error or receives an error signal from the slave and then clears the the BBSY signal and retries. When, after the retry is repeated three times, the error is still detected, an interrupt signal is generated.

The operation will be described next. Here, the operation of interrupt includes a cycle wherein a unit on the H-bus delivers an interrupt signal to the arithmetic unit ACU on the same bus. Firstly, the interrupt ATNI signal from the channel unit is sent to the arithmetic control unit ACU. The ACU responds to the ATNI signal to check to see whether the ACU is executing the instruction or not. If the ACU does not execute the instruction, the signal ATNB to obtain control of the bus is applied to the bus controller BC. The operation following this is the same as the bus obtaining operation described above.

When the H bus is acquired, the ACKB signal is returned back to the arithmetic control unit ACU. Then, the ACU checks as to whether the bus is being used or not. If it is not used, it sends to the channel unit the ACKI signal indicating that the interrupt is accepted. When receiving the ACKI signal, the channel unit transfers a channel control block address to the arithmetic control unit ACU. As a result, a parity check or EEC check is performed in the arithmetic control unit. After this, the arithmetic control unit ACU clears BUS BUSY, and generates the BBSY signal to the bus controller BC and the channel unit to reset the watch dog timer in the bus controller BC, whereupon the interrupt operation is terminated.

The bus controller BC sets the watch dog timer in response to the BBSY signal and monitors the time during which the master occupies the H bus, and unless the BBSY signal resets it within several microseconds, it is deemed as error. On the basis of the error signal, an interrupt signal is produced for the arithmetic control unit to force it to be in a bus stall. The result is that, no response from a slave is detected. The H bus occupation time of the master is monitored by the bus controller and when its time exceeds a predetermined value, it produces error information. Responsive to the error information, the input/output unit as master releases the H bus and makes an interrupt of error termination against the ACU.

Although little has so far been mentioned of the L bus in the information processing system of the invention, the L bus is substantially the same as the conventional input/output bus shown in FIG. 2 and is controlled by the arithmetic control unit ACU. Accordingly, the L bus is completely separated from the H bus under control of the bus controller BC. Therefore, a unit connected to both the buses may be used in the time-sharing and multiplexing mode.

The foregoing description relates to the construction and operation of the H-bus interface circuit shown in FIGS. 7 to 16.

Returning again to the bus controller BC shown in FIG. 6, let us consider the error check in the bus controller and the function of the zone control. In connection with the function of the error generation detection circuit 42 and the zone control circuit 43, when data of one byte (8 bits) is loaded into a memory of 16 bits + 1 parity bit, for example, a conventional error check method reads out the contents of the writing address. Then, only the contents of the one byte data in the read-out data is rewritten and the corresponding parity bit is attached to it and then loaded into the memory. In the error check method of the invention, however, the parity bit attaching methods are standardized in the arithmetic unit, the memory unit and the input/output bus. Further, it permits a partial loading of data into the main memory unit. A common parity check method also is available for different data lengths in the data transfer among the three units (arithmetic control unit, main memory unit and input/output unit). This arises from the employment of the parity generation and check method and the zone control method, both of which will be described in detail later.

Figure 18:
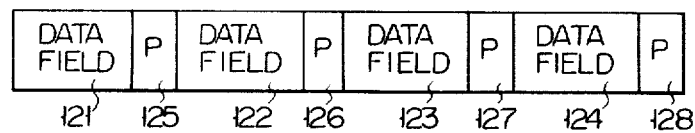
FIG. 18 illustrates the data format including parity bits used in the present invention.

The data format used in the error check procedure of the invention is shown in FIG. 18. FIG. 18 shows an example of the data format including parity bits used in the described embodiment of the invention. In the figure, numerals 121 to 124 each designate a one byte data field and 125 to 128 indicate parity bits relating to the corresponding data fields 121 to 124. In the data format used in the computer system as shown in FIG. 18, the shortest data length (for example, one byte) is treated as a component and one bit or more of parity is attached to each component. With such a scheme, a read or write operation for each byte (one component) is possible. Further, the parity bit may be generated and detected for each bit. Accordingly, even when the unit in the computer system handles four bytes (four components) at maximum, the generation and detection of the parity bit for 1 to 3 bytes may similarly be performed. For example, when data is transferred from the input/output unit to the main memory unit MMU, the data may pass through the bus controller BC without rearranging the parity bits in the bus controller BC. In the bus controller BC, the parity bits may be generated by using a parity generator. For this, if the data in the arithmetic control unit has not parity bits attached thereto, an error check code (parity bits or EEC code) may be attached to them in the bus controller BC. Therefore, data transfer through the memory bus and the H bus is possible.

Figure 19:
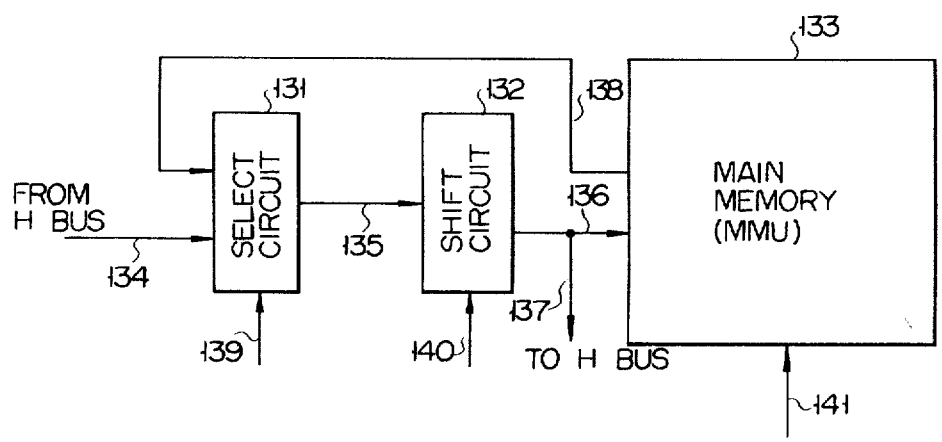
FIG. 19 is a block diagram of a zone control circuit used in the invention.

The explanation to follow is the zone control circuit 43 in FIG. 6. FIG. 19 shows an example of the zone control scheme employed in the invention. In the figure, a circuit 131 selects either data transferred through the H bus (from the ACU or I/O) or data read out from the memory unit MMU. A shift circuit 132 shifts data in the mode depending on the memory location of the memory unit and the data length. The main memory 133 is of the full word type (for example, 32 bits) and permits partial loading by bytes. Reference numeral 134 designates input data from the H bus; 137 output data to the H bus (CPU, I/O); 136 write data to the main memory 133; 138 read out data from the main memory; 139 a control signal for selecting either data 134 in the read mode or data 138 in the write mode; 135 transfers data selected from data 134 or 138; 140 applies a control signal in shift mode; 141 a control signal for controlling the partial loading for each byte to the main memory 133.

When the main memory 133 and the DMA bus are constructed by a full word (for example, 32 bits), the data of half a word (16 bits) is transferred by lower two bytes and the byte data, by only the least significant byte.

A read or write operation within the main memory 133 is performed for four bytes (one full word). Accordingly, if one byte is allocated to one address, it is possible to access the four bytes $4N \sim 4N+3$ (where N is O or a positive integer) at one time. In the write operation, loading is made into only the address for data storing in those bytes of four, that is to say, the part loading is possible. In the read operation, the four bytes are all read out therefrom. When the data of one byte is loaded into the 4N+1 address, the length of input data to the main memory is the full word length. For this, the data format must be changed so that the data corresponding to the second byte (the data field 122 in FIG. 8) counted from the upper is set.

Conversely, when one byte data is read out from the address 4N+1, since the read-out data is located at the second byte counted from the upper, it must be shifted to the location at the least significant byte and the remaining upper three bytes must all be "0".

The zone control employed in the invention is comprised of the shift circuit 132 for converting the data format, the main memory 133 of the full word type which is capable of partial loading for each byte, and the circuit 131 for selecting the data to be shifted from the H bus or the main memory 133.

The operation of the zone control used in the invention will be described in detail with reference to FIG. 19.

In FIG. 19, a write operation in the main memory 133 is performed through a route including data line 134-selection circuit 131-data line 135-shift circuit 132-data line 136-main memory 133. The read operation from the main memory is performed through a route including main memory 133-data line 138-selection circuit 131-data line 135-shift circuit 132-data line 136. The data pass through these routes in the full word format. However, the location of the effective data in the full word is different between the H bus and the main memory 133, depending on the byte number of the data to be read or written and the memory location in the main memory 133. Therefore, the shift circuit 132 is used to properly shift the data.

Figure 20:
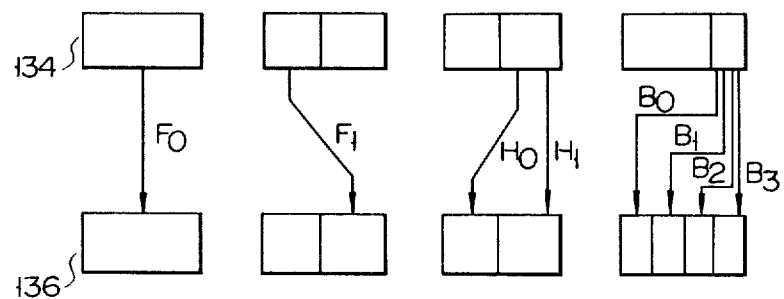
FIGS. 20 and 21 are block diagrams illustrating zone control processing when read and write operations are conducted.
Figure 21:
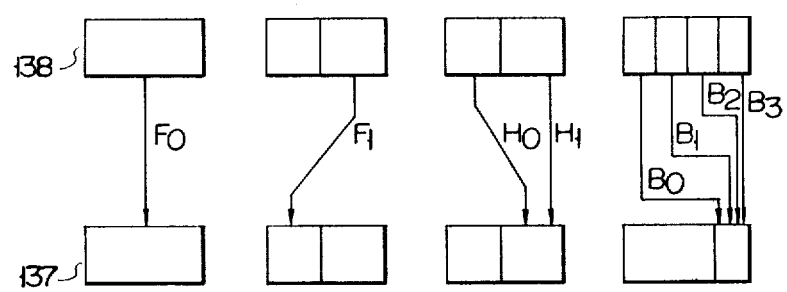

The shift operation of the shift circuit 132 will be described with reference to FIGS. 20 and 21. FIG. 20 schematically illustrates the shifting operation in the write mode and FIG. 21 shows the shifting operation in the read mode. In the figures, $F_0$, $F_1$, $H_0$, $H_1$, $B_0$, $B_1$, $B_2$ and $B_3$ indicate modes determined depending on the memory location (the least significant two bits of the address) of the main memory 133 and the number of bytes of data. The relation among those and the data is as follows:

TABLE 5

| Mode | Data Unit | A0 | A1 | D0 | D1 | D2 | D3 |
|------|-----------|----|----|----|----|----|-----|
| F0 | Full Word | 0 | * | ◇ | ◇ | ◇ | ◇ |
| F1 | (4 bytes) | 1 | * |  |  | ◇ | ◇ |
| H0 | Half Word | 0 | * | ◇ | ◇ |  |  |
| H1 | (2 bytes) | 1 | * |  |  | ◇ | ◇ |
| B0 | 1 Byte | 0 | 0 | ◇ |  |  |  |
| B1 |  | 0 | 1 |  | ◇ |  |  |
| B2 |  | 1 | 0 |  |  | ◇ |  |

TABLE 5-continued

| Mode | Data Unit | A0 | A1 | D0 | D1 | D2 | D3 |
|------|-----------|----|----|----|----|----|-----|
| B3 |  | 1 | 1 |  |  |  | ◇ |

In table 5, $A_0$ is the contents of the second bit counted from the least significant bit of the main memory 133; $A_1$ the contents of the least significant bit of the same; $D_0$ to $D_3$ number of four bytes in one full word; ◇ memory location of data. An asterisk (*) may be "0" or "1".

Figure 22:
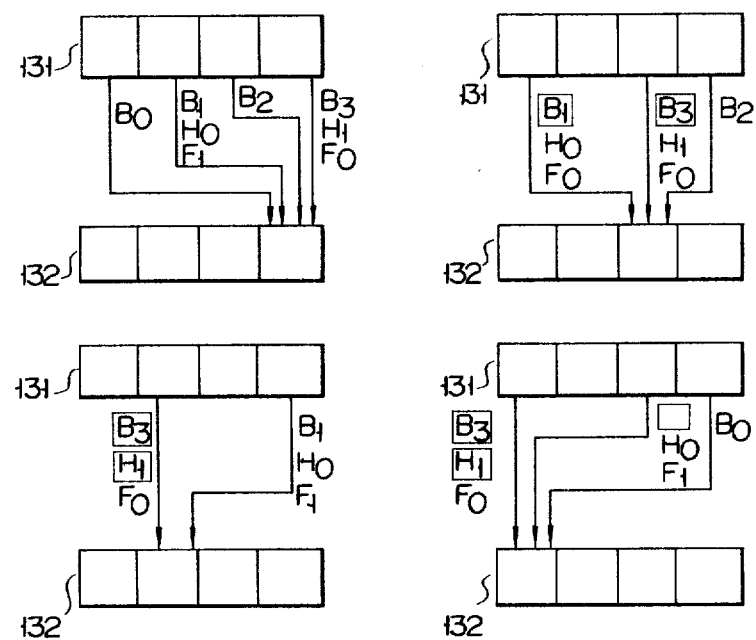
FIG. 22 schematically illustrates a shift operation performed byte by byte in each operation mode.

FIG. 22 illustrates shift operations by each byte in the respective modes and is a composite function of those operations illustrated in FIGS. 20 and 21. The mode enclosed by a square such as B1 in FIG. 22 are not actually represented in FIGS. 20 and 21, and are not used in the actual shift operations described. However, use of such modes may be readily effected and remarkably simplify the shift control. The square-enclosed modes do not allow loading of data into the write address of the main memory 133 in the write mode. In the read mode, it is made "0" by an output gate of the shift circuit 132 so that data of necessary byte numbers may be read out from the main memory 133. Additionally, the shift operation of data in the respective modes B1, H0 and F1 are the same as seen in FIG. 20. The shift operation of data in the modes B3, H1 and F0 are substantially the same. Therefore, eight modes F0 to B3 may be reduced to four groups (B0), (B1, H0, F1), (B2), and (B3, H1, F0). In the shift control of the shift circuit 132, control of the four bytes may be conducted by the same two bits or a part of its signal.

FIG. 23 illustrates the conditions of signals $E_0$ to $E_3$ to control the output gate in the shift circuit 132 in order to make "0" the unnecessary part of the output data when data is read out from the main memory 133, with respect to the respective modes. FIG. 24 illustrates the conditions of control signals $S_0$ to $S_3$ with respect to the respective modes when data is loaded into the main memory. The control signals $E_0$ to $E_3$ and $S_0$ to $S_3$ may also be formed by using a signal represnting byte number and the least significant two bits of the address. As seen from FIG. 22, the shift circuit 132 may be formed by a multiplexer for selecting one of 2, 3 or 4 kinds of data. For this, the shift processing time may considerably be reduced. Accordingly, the time required for the read and write operations for the main memory 133 is substantially equal to the operation of the main memory 133 per se. As a result, its operation takes substantially the same amount of time as that required for the ordinary main memory 133, irrespective of the data component.

As described above, the zone control used in the invention fully utilizes the capacity of the main memory 133. The time taken for the write operation into the main memory may be substantially equal to the write time of the main memory per se. Additionally, when data is read out from the main memory 133, the same shift circuit 132 is used so that the amount of hardware is considerably reduced. Since the control of the shift circuit 132 operates for four kinds of modes, the control logic is very simple and a specially designed and additional timing circuit is unnecessary because it may be constructed by the multiplexer.

This is true when data includes parity. If the parity bit part of the selection circuit 131 is independent from the control by the control signals Eo to E1, only the parity bits may be outputted irrespective of the data length.

From the foregoing, it will be seen that the bus controller according to the invention includes a control system for the H bus and memory independently of the arithmetic control unit ACU.

For satisfying the need for functionally and physically expanding and effectively using computer systems, there has recently been proposed and used a multiprocessing system which is a combination of a plurality of data processing system sections. Also in accordance with the invention, a multiprocessing system may be constructed by linking the H buses of indivisual data processing system sections by a computer system link (CSL) device. In the CSL, each pair of data processing system sections is completely insulated by a distance therebetween of for example 50 m (10 ns/m), thus being free from trouble. Further, the status (presence or not of trouble) of the opposite data processing system sections may be catched.

The multiprocessing system has standardized addresses and when the CSL accepts a request, it automatically regulates the transfer of information. Thus, sources (various units) in the individual computer system sections (CSS) are commonly coupled. Here, common coupling means relative to FIG. 25, CSS No. 1 141 is capable of accessing the memory unit of CSS No. 2.

Figure 25:
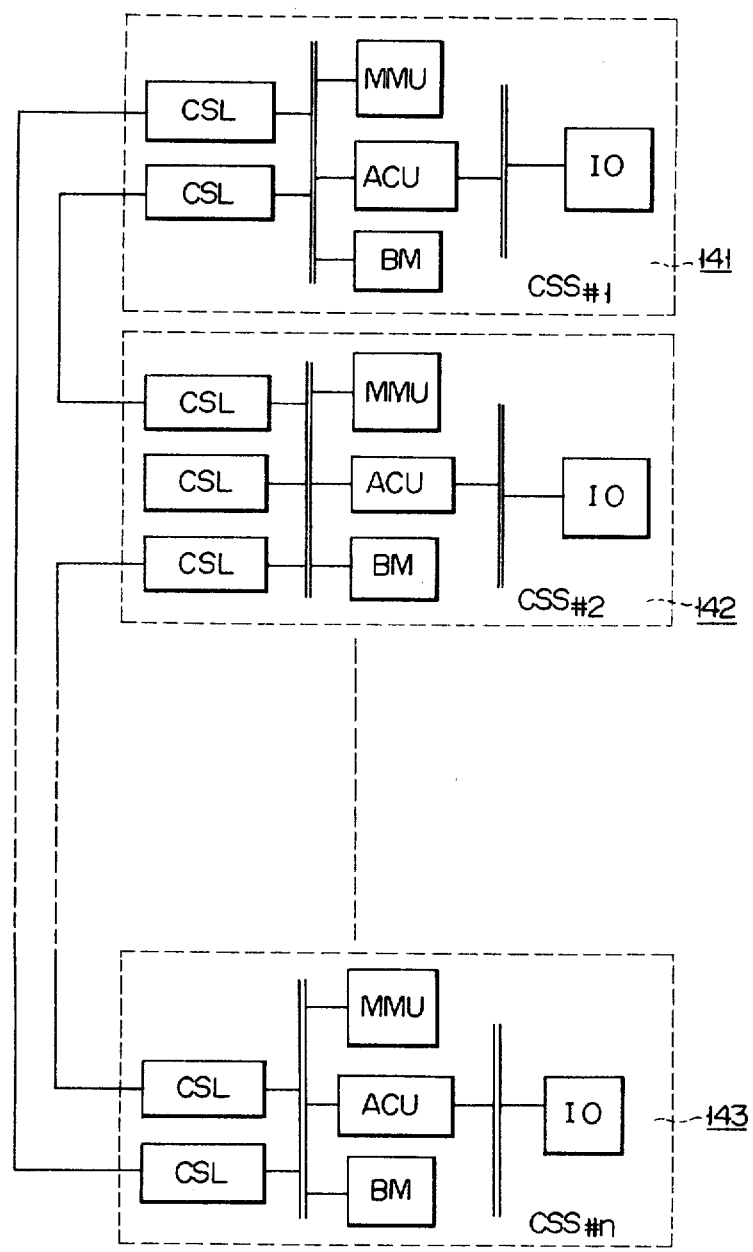
FIG. 25 shows a block diagram of a multiprocessing system including a plurality of information processing systems according to the invention.

FIG. 25 shows a block diagram of the linkage arrangement between computer systems. Through the linkage, the following operations will be performed among a plurality of the CSSs No. 1 . . . No. n.

(1) The ACU in one computer system section can access the memory unit in another computer system section.

(2) The ACU in one computer system section can drive the input/output unit of the same system and transfer data to the main memory unit of another computer system section.

(3) The ACU in one computer system section can drive the main memory unit of another computer system section and transfer data to the main memory unit of the same section or the other computer system section.

(4) Interrupts can be made between the ACUs.

In order to effectively attain these operations, the complex computer system employs a common bus system in each section. Accordingly, the ACU, the main memory unit MMU and the input/output I/O are indistinguishable and considered to be on the same rank on the common bus, so that data transfer from one unit to another is possible.

In connection with this operation, the CSL is considered as one of the input/output units, as shown in FIG. 7 and the succeeding figures. Therefore, the operation includes the bus securing operation and the transfer sequence similar to that previously described so that further description of those operations is unnecessary.

Figure 26:
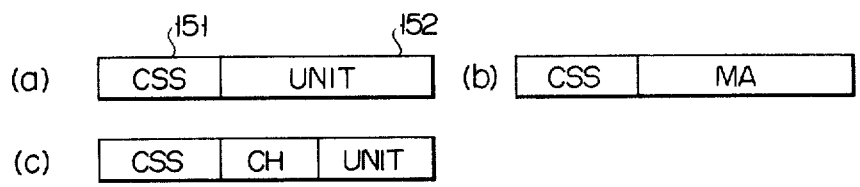
FIG. 26 shows an address format which may be used in the multiprocessing system according to the invention.

An address system among the CSSs No. 1 to No. n must be provided. FIG. 26 shows an address format in such a multiprocessing system. In the figure, (a) shows the format used when one computer system section accesses a unit in another section, and (b) shows the format used when a unit in one computer system section accesses the main memory unit MMU in another section. (c) is the format of an input/output instruction. In the format in (a), the respective units are designated by a unit section 152 and the computer system section CSS 151 is used to designate the other computer system section. Thus, when a unit in the same computer system section is designated, the CSS section 151 is "0" and when the CSS is in a state other than "0", the units in other computer system sections are designated.

For example, when the first computer system section CSS No. 1 (FIG. 25) designates a unit in the second computer system section CSS No. 2, the master in the first computer system section CSS No. 1 delivers an address signal which is a unit address with a computer system address CSS attached. When receiving the address, the second computer system link device CSL of the second computer system section CSS No. 2 delivers the unit address to the CSL in the first CSS No. 1. Upon receipt of the unit address, the CSL operates as the master in the system section to transfer data to and from the slave designated through the common bus (H bus), as described above.

During the operation, if the master in the CSS No. 1 who calls for the CSS No. 2 to make a data transfer occupies the H bus, the use efficiency of the H bus is reduced. For this, the embodiment of the invention employs the following system.

When the ACU is master and the CSL is slave, there is a case that, when the CSL transfers data to and from another CSL, the former CSL can not respond to an access from the ACU. In such a case, if the ACU waits until the operation of the CSL is completed, the desired end is attained. However, data transfer between the CSLs usually takes a relatively long time, with the result that, if the ACU exclusively uses the H bus, the bus use efficiency is reduced. Consequently, when the CSL is operating, it returns a WAIT signal to the ACU (master).

When the ACU receives the WAIT signal, it temporarily releases the H bus and, after a given time, it issues a bus attainment request. If the CSL is not in operation, it returns an ACPT signal and data transfer is performed between the ACU and the CSL.

When the master transfers data to the slave, it successively sends address data to the slave and releases the H bus. Conversely, when the master requires the slave to transfer data to the master, the latter generally sends an address to the slave to gain data therefrom (read-out of data from the mein memory unit). However, data transfer between the CSLs generally takes a long time. Accordingly, if the H bus is continuously occupied by the data transfer, the use efficiency of the H bus is substantially reduced. For this, the master successively sends the unit address of the slave and the unit address of the master itself to the CSL to release the H bus. Then, the CSL stores the unit address of the master and when it receives a response of the data from another CSS, it sends data to the first requesting party (master). At this time, the CSL secures the H bus and it becomes the master. Then, it produces the first master address having been stored therein to make that unit the slave and then to transfer the data thereto.

Thus, the H bus is released for use by units other than that awaiting a response from the CSL.

Figure 27:
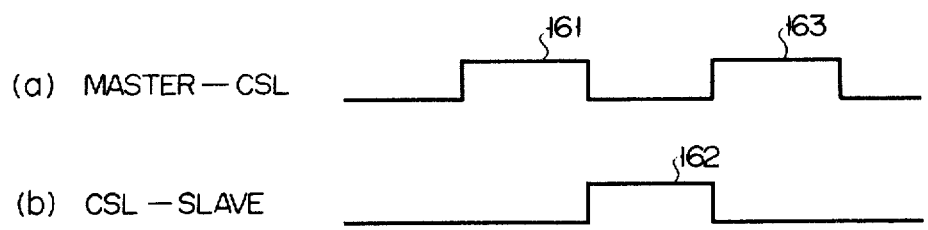
FIG. 27 is a timing diagram illustrating data transfer between a master and a slave unit in the multiprocessing system.

The timing of the operation described above is shown in FIG. 27.

FIG. 27(a) shows timing diagrams when an instruction is transferred from the CSS No. 1 to the CSL. FIG. 27(b) shows timing diagrams of data transfer between the CSL of the CSS No. 2 and its slave. In the figures, reference numeral 161 designates a request cycle, and 163 is representative of the data transfer time cycle. During this time, the H bus of the first computer system section CSS No. 1 is available for the units other than the master. Reference numeral 162 designates a response cycle.

In the case of an input/output instruction, CSS number, channel number CH, and unit number UNIT are designated as shown in FIG. 26 and the CSS number of the address drives the corresponding CSS which in turn delivers a parameter followed by an input/output instruction to another system. When receiving the parameter, the CSL of the other system delivers a channel parameter designated to execute the instruction.

In accessing the memory unit in the other system, the CSS number and the address MA of the main memory unit to be addressed are specified, to attain the desired end.

Let us consider now interrupt processing in the above system from the input/output unit I/O upon completion of data transfer and another interrupt processing from one ACU to another.

Upon completion of the input/output operation (or its ceasing due to an error or the like), the channel unit interrupts the ACU which has triggered the input/output process. This case requires an interrupt operation different from the interrupt made against the ACU in its system. The channel unit always holds the number of the triggered ACU (usually coincident with the CSS number) and, when the input/output process is completed, it specifies the CSL by the address information of the CSS number to send an interrupt parameter such as an CCS address. Upon receipt of the information, the CSL provides for the parameter to the one in another system section which in turn issues an interrupt request.

Figure 28:
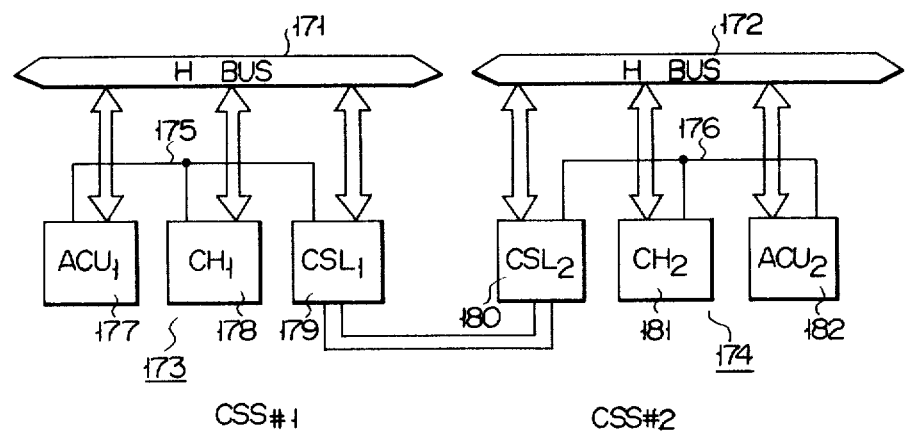
FIG. 28 is a block diagram schematically illustrating interrupt control operations in the multiprocessing system according to the invention.

The above-mentioned operation will be described with reference to FIG. 28 schematically illustrating the interrupt.

In FIG. 28, only the coupling between the CSS No. 1 173 and the CSS No. 2 174 is illustrated for the purpose of simplicity. The explanation to first be given is a case where the ACU1 177 in the CSS No. 1 starts the input/output unit in the channel 2 181 and the channel 2 makes an interrupt against the ACU1 177. First, the unit to make the interrupt, or the channel 2, transfers interrupt data to the CSL2 180 through the H bus 172. In response to the interrupt data, the CSL2 180 transfers the interrupt parameter to the CSL1 179 of the CSS No. 1 173.

Here, the CSL1 179 delivers the interrupt parameter to the ACU1 177 through an interrupt request line 175. Of course, the ACU2 182 makes an interrupt against the ACU1 177 in a similar way.

As seen from the foregoing, the interrupt service to the ACU in its system is carried out by using a dedicated interrupt request line and the interrupt against the ACU in other system sections is performed by the H bus.

Further, it will be seen from the foregoing that in the invention, control of the H bus and the memory bus is independent from control of the ACU. Therefore, the operation execution by the ACU is concurrent with the operation of the input/output or the memory, with the result that the throughtput of the system is improved. Additionally, the control means of the H bus is independent from the ACU so that the number of tasks assigned to the ACU is reduced and its related logics are simplified. Accordingly, information transfer between any two system units is possible through the H bus, thus attaining a maximum utilization of the common bus. Error checking or generation of error check codes (parity bits and ECC codes) of the buses connected to the bus controller BC may be carried out individually for each bus. For example, if the data from the ACU has no parity bit, the parity bit is attached to the data in the bus controller BC and is directed to the memory bus or the H bus. The generation and detection of the parity may be conducted for each unit so that, when a unit in the system handles four bytes (four units) at maximum, the generation and detection of parity bits for the data of 1 to 3 bytes may be done in much the same way, and further read and write operations for the memory unit may be made for each byte.

With the inventive architecture of the invention, the H bus controls the bus controller BC and the L bus controls the arithmetic control unit. Accordingly, the units connected to the respective buses may be used in time sharing and multiplexing modes.

With the multiprocessing system, it may easily be expanded if the computer system sections used are increased by increasing the number of the computer system link devices. Such a computer system expansion leads to improvement of the processing efficiency of the system. Irrespective of increasing of the number of the system sections CSS or the memory capacity of the memory unit, when access is made to the memory unit, the addressing may be made by merely changing the system address. Accordingly, regardless of attachment of the computer system address, the same addressing, when viewed from the arithmetic control unit, may specify the same block of the memory. In the data transfer request or data transfer in the same computer system section CSS, only the common bus in its system section is occupied without occupying the common bus in other system sections, so that the common bus may be used at will in other system sections. In transferring data between different computer system sections CSSs, the data transfer request and the data transfer are separately carried out. For this, the common bus of a computer system section including the arithmetic control unit having issued the data transfer request is vacant until data transferred from another system section reaches it. Accordingly, during that time period, the bus may be used in the system section. In the interrupt service in the same computer system section CSS, a dedicated interrupt line is used and therefore other system sections may use the common bus in the former section.

What is claimed is:

1. An information processing system including a main memory unit, arithmetic control unit and a plurality of input/output units;

a first bidirectional bus through which said main memory unit, said arithmetic control unit and at least a first of said plurality of input/output units are commonly connected;

a bus controller adapted to manage a first bus access requirement relative to said main memory unit, said arithmetic control unit and said first input/output unit; one unit of said main memory unit, said arithmetic control unit and said first input/output unit functioning as a master unit and another of said units functioning as a slave unit under the control of the bus controller whereby data is transferred between said master and slave units; said bus controller including means for processing a bus request from said arithmetic control unit and for granting said request, whereupon said arithmetic control unit and a slave unit are directly coupled via said first bus for the transfer of address and data information therebetween;

a second bidirectional bus through which said arithmetic control unit and a second input/output unit are commonly connected; and bus control means provided in said arithmetic control unit to control data transfers between said units connected to said second bidirectional bus.

2. An information processing system according to claim 1, in which the respective units connected to said first and second busses are used in time sharing and multiplexing modes.

3. An information processing system according to claim 1, in which said first bus permits data transfer at a high speed.

4. An information processing system according to claim 1, in which said bus controller controls said main memory unit, said arithmetic control unit and said first input/output unit and said units are operable as either master or slave under control of said bus controller.

5. An information processing system according to claim 1, in which said bus controller comprises a first bus interface circuit for controlling data transfer between any two units selected from said main memory unit, said arithmetic control unit and said first input/output unit, and further comprising a zone controller in which writing or reading operations may be carried out for a desired unitary number of bytes to and from the main memory unit.

6. An information processing system according to claim 5, in which said first bus interface circuit comprises an interrupt control circuit for controlling an interrupt request, a bus attainment circuit for coupling a master unit with a slave unit, and a data transfer control circuit for controlling data transfer between said master and said slave units.

7. An information processing system according to claim 5, in which said bus controller comprises means for generating a signal permitting use of said first bus when said first bus is released for a first bus request from said master unit, means for generating a signal to maintain the right to use said first bus, means for checking as to whether said slave unit is operable or not, means for specifying the mode of operation between said master and slave units, and means for controlling data transfer between said master and slave units in accordance with said specified operation mode.

8. An information processing system according to claim 7, in which, when the operable state of said slave unit is checked and, as a result of the check, said slave unit cannot respond, a specific signal is returned to said master unit and said master unit, upon receipt of said specific signal, releases said first bus and, after a given time, obtains again said first bus to check as to whether said slave unit is operable or not.

9. A multi-processing system comprising a plurality of information processing systems, each information processing system comprising:

a first bidirectional bus through which said main memory unit, said arithmetic control unit and at least a first of said plurality of input/output units are commonly connected;

a bus controller adapted to manage a first bus access requirement relative to said main memory unit, said arithmetic control unit and said first input/output unit; one unit of said main memory unit, said arithmetic control unit and said first input/output unit functioning as a master unit and another of said units functioning as a slave unit under the control of the bus controller whereby data is transferred between said master and slave units; said bus controller including means for processing a bus request from said arithmetic control unit and for granting said request, whereupon said arithmetic control unit and a slave unit are directly coupled via said first bus for the transfer of address and data information therebetween;

a second bidirectional bus through which said arithmetic control unit and a second input/output unit are commonly connected;

bus control means provided in said arithmetic control unit to control data transfers between said units connected to said second bidirectional bus; and in which the first busses of the plurality of information processing systems are linked through a computer system linkage device.

10. A multiprocessing system according to claim 9, further comprising means by which said arithmetic control unit in one system accesses said main memory unit of another system, means in which said arithmetic control unit drives said input/output unit in one system and the data transfer is carried out to the main memory unit of another system, means in which said arithmetic control unit in one system drives said input/output unit in another system and the data transfer is carried out to the main memory unit of the former or the latter system, and means for transferring an interrupt between said arithmetic control units.

* * * * *